United States Patent
Go et al.

(10) Patent No.: US 11,973,713 B2
(45) Date of Patent: Apr. 30, 2024

(54) METHOD FOR TRANSMITTING SOUNDING REFERENCE SIGNAL IN WIRELESS COMMUNICATION SYSTEM, AND DEVICE THEREFOR

(71) Applicant: LG ELECTRONICS INC., Seoul (KR)

(72) Inventors: Seongwon Go, Seoul (KR); Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 453 days.

(21) Appl. No.: 17/427,721

(22) PCT Filed: Feb. 10, 2020

(86) PCT No.: PCT/KR2020/001847
§ 371 (c)(1),
(2) Date: Aug. 2, 2021

(87) PCT Pub. No.: WO2020/162736
PCT Pub. Date: Aug. 13, 2020

(65) Prior Publication Data
US 2022/0116178 A1    Apr. 14, 2022

(30) Foreign Application Priority Data

Feb. 8, 2019    (KR) ........................ 10-2019-0015146

(51) Int. Cl.
*H04L 5/00*    (2006.01)
*H04L 1/00*    (2006.01)
*H04W 72/0446*    (2023.01)

(52) U.S. Cl.
CPC .......... *H04L 5/0051* (2013.01); *H04L 1/0013* (2013.01); *H04W 72/0446* (2013.01)

(58) Field of Classification Search
CPC . H04L 5/0051; H04L 1/0013; H04W 72/0446
See application file for complete search history.

(56) References Cited

U.S. PATENT DOCUMENTS 8,913,578 B2    12/2014  Noh et al.
9,876,617 B2 *   1/2018  Ouchi ................... H04W 72/23
(Continued)

FOREIGN PATENT DOCUMENTS

EP          2806581         9/2016
KR          10-1380558      3/2014
WO          WO2018203653    11/2018

OTHER PUBLICATIONS

PCT International Search Report in International Appln. No. PCT/KR2020/001847, dated May 22, 2020, 7 pages.
(Continued)

*Primary Examiner* — Ricky Q Ngo
*Assistant Examiner* — Stephen N Steiner
(74) *Attorney, Agent, or Firm* — Fish & Richardson P.C.

(57) ABSTRACT

Disclosed in the present specification is a method by which a terminal transmits a sounding reference signal (SRS) in a wireless communication system, the method: receiving, from a base station, configuration information relating to an SRS transmission, wherein the configuration information includes a first parameter set relating to a first SRS transmission and a second parameter set relating to a second SRS transmission; receiving downlink control information (DCI) from the base station; and transmitting, to the base station, a first SRS and/or a second SRS on the basis of the DCI.

12 Claims, 17 Drawing Sheets

(56) References Cited

U.S. PATENT DOCUMENTS

2012/0093119 A1* 4/2012 Kim .................. H04L 27/2613
370/329
2014/0334390 A1 11/2014 Lindholm et al.

OTHER PUBLICATIONS

LG Electronics, "Discussion on UL beam management," R1-1707605, Presented at 3GPP TSG RAN WG1 Meeting #89, Hangzhou, China May 15-19, 2017, 6 pages.
Notice of Allowance in Korean Appln. No. 10-2021-7026892, dated Jun. 7, 2022, 5 pages (with English translation).
OPPO, "Text proposal for SRS," R1-1800485, Presented at 3GPP TSG RAN WG1 Meeting AH 1801, Vancouver, Canada, Jan. 22-26, 2018, 10 pages.
RAN WG 1, "LS to RAN2 on aperiodic SRS triggering," R1-1805625, Presented at 3GPP TSG RAN WG1 Meeting #92bis, Sanya, China, Apr. 16-20, 2018, 1 page.
Zte et al., "Correction to the additional UpPTS symbols for SRS," R1-161305, Presented at 3GPP TSG-RAN1 Meeting #84, St Julian's, Malta, Feb. 15-19, 2016, 8 pages.
Extended European Search Report in European Appln. No. 20753194. 8, dated Feb. 3, 2022, 12 pages.
Huawei & HiSilicon, "Outcome of offline discussion on SRS enhancements for LTE," R1-1813748, Presented at 3GPP TSG RAN WG1 Meeting #95, Spokane, USA, Nov. 12-16, 2018, 4 pages.

LG Electronics, "Discussion on additional SRS symbols," R1-1910580, Presented at 3GPP TSG RAN WG1 Meeting #98bis, Chongqing, China, Oct. 14-20, 2019, 6 pages.
Nokia et al., "Changes to FS2 SRS triggering for shorter TTI (36.212, 36.213)TP#5," R1-1807216, Presented at 3GPP TSG RAN WG1 Meeting #93, Busan, Republic of Korea, May 21-25, 2018, 14 pages.
Office Action in Korean Appln. No. 10-2021-7026892, dated Feb. 25, 2022, 11 pages (with English translation).
Vivo, "Further discussion on SRS enhancements," R1-1812280, Presented at 3GPP TSG RAN WG1 Meeting #95, Spokane, USA, Nov. 12-16, 2018, 4 pages.
3GPP, "3rd Generation Partnership Project; Technical Specification Group Radio Access Network; NR; Physical channels and modulation (Release 15)," TS 38.211 V15.4.0, Dec. 2018, 96 pages.
3GPP, "3rd Generation Partnership Project; Technical Specification Group Radio Access Network; NR; Multiplexing and channel coding (Release 15)," TS 38.212 V15.4.0, Dec. 2018, 100 pages.
3GPP, "3rd Generation Partnership Project; Technical Specification Group Radio Access Network; NR; Physical layer procedures for data (Release 15)," TS 38.214 V15.4.0, Dec. 2018, 102 pages.
Office Action in Korean Appln. No. 10-2021-7026892, dated Nov. 11, 2021, 11 pages (with English translation).
Sony, "Summary of SRS," R1-1803410, Presented at 3GPP TSG RAN WG1 Meeting #92, Athens, Greece, Feb. 26-Mar. 2, 2018, 31 pages.

* cited by examiner

[FIG. 1]
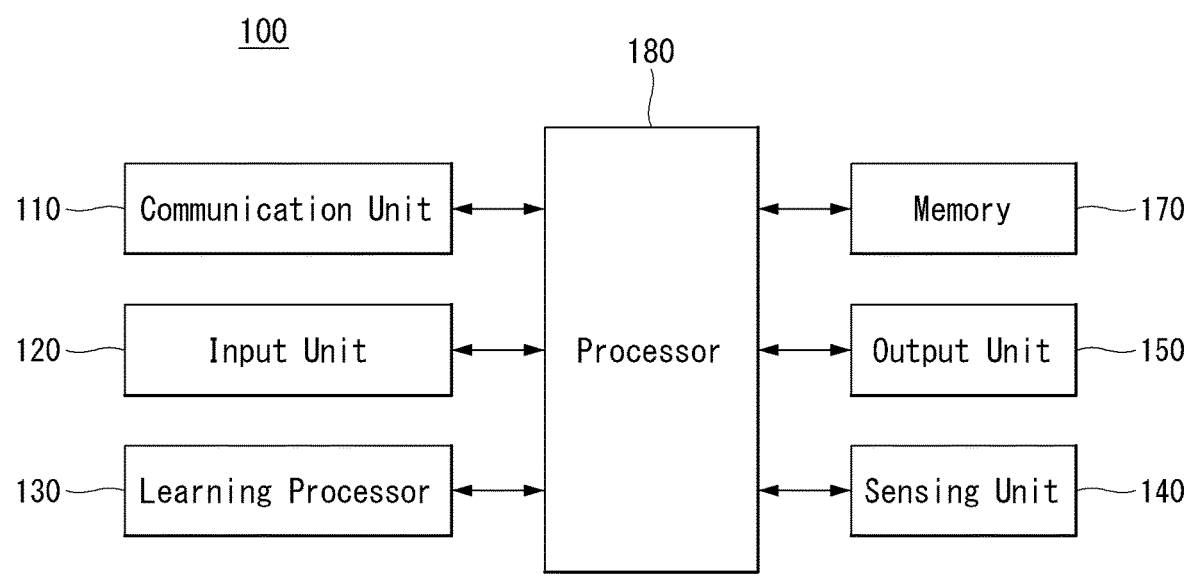

[FIG. 2]
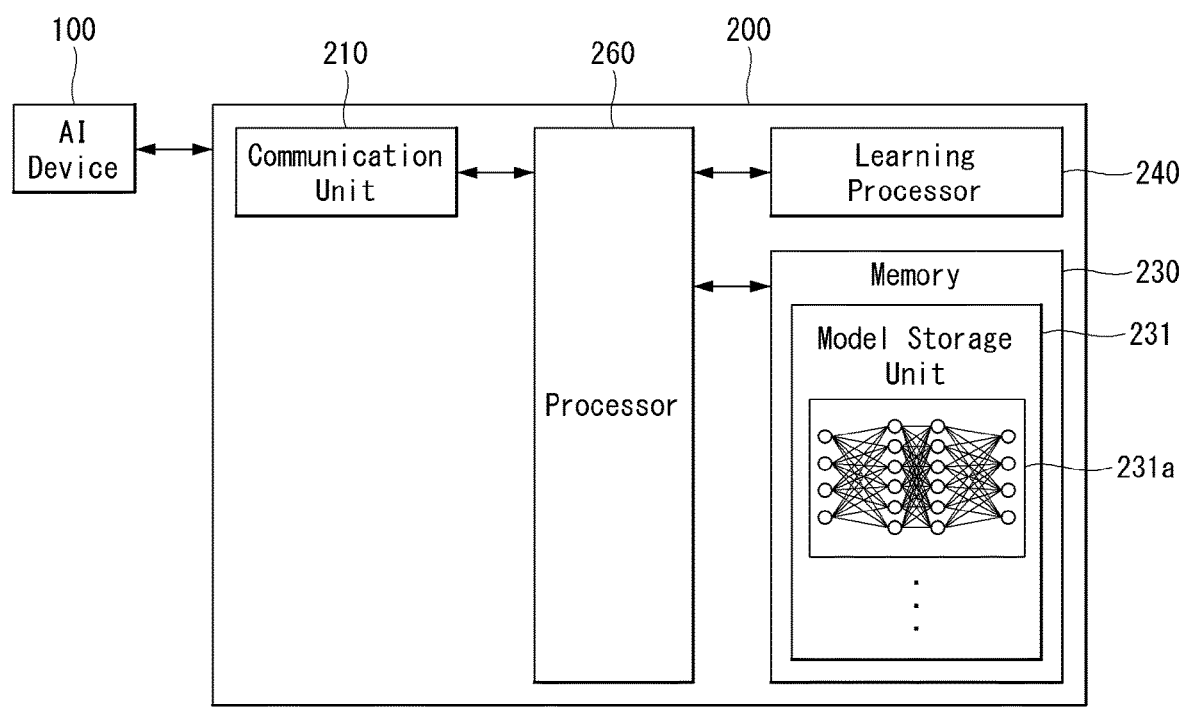

[FIG. 3]
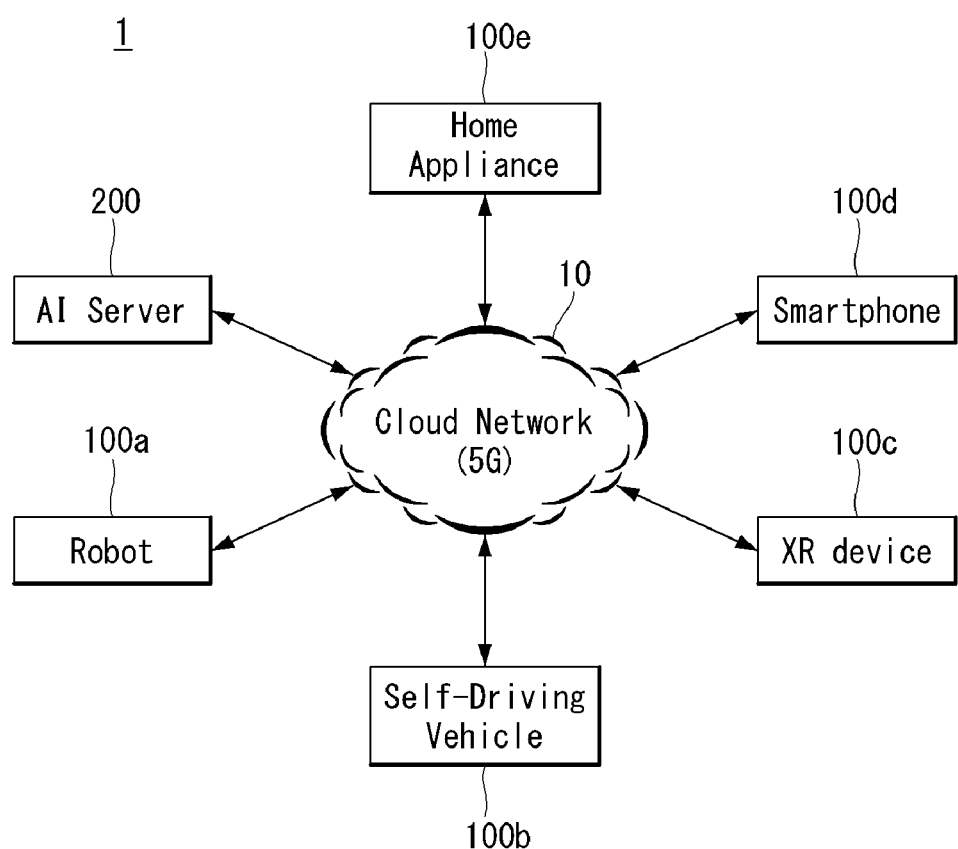

[FIG. 4]
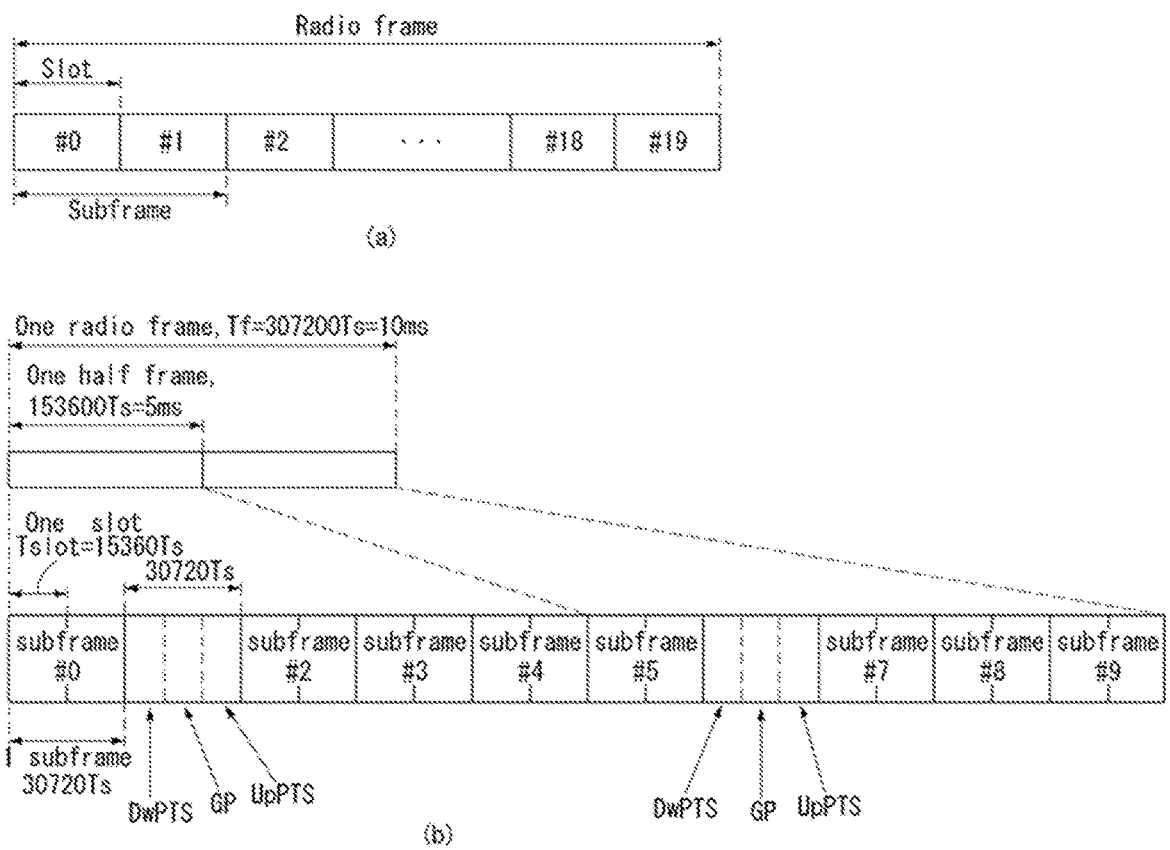

[FIG. 5]
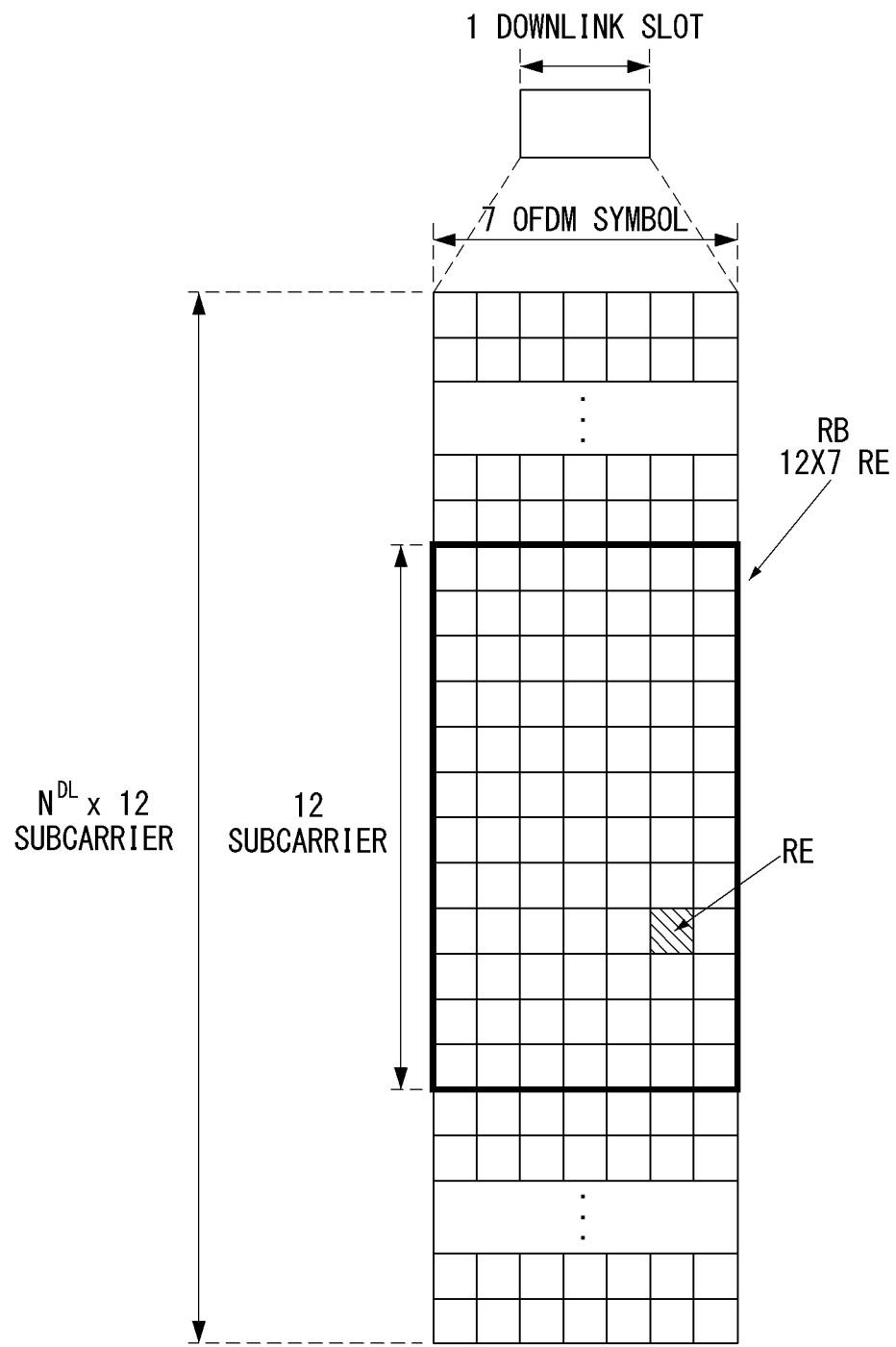

[FIG. 6]
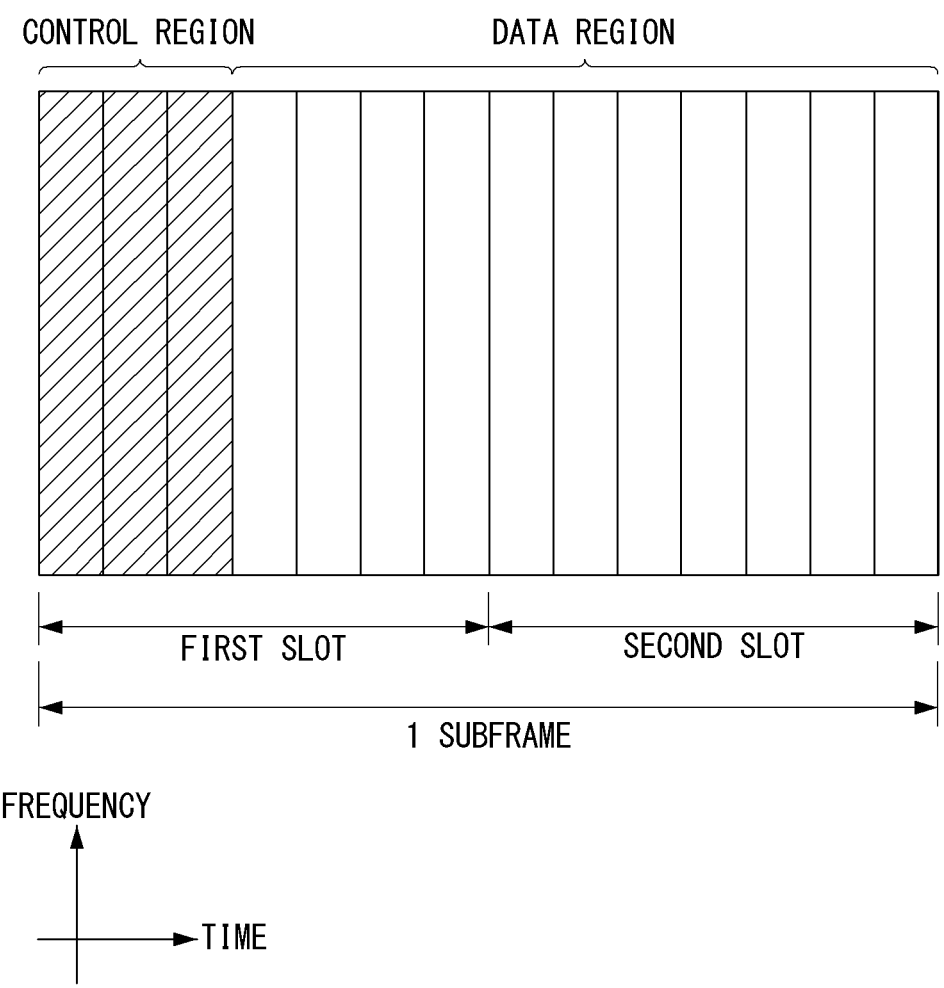

[FIG. 7]
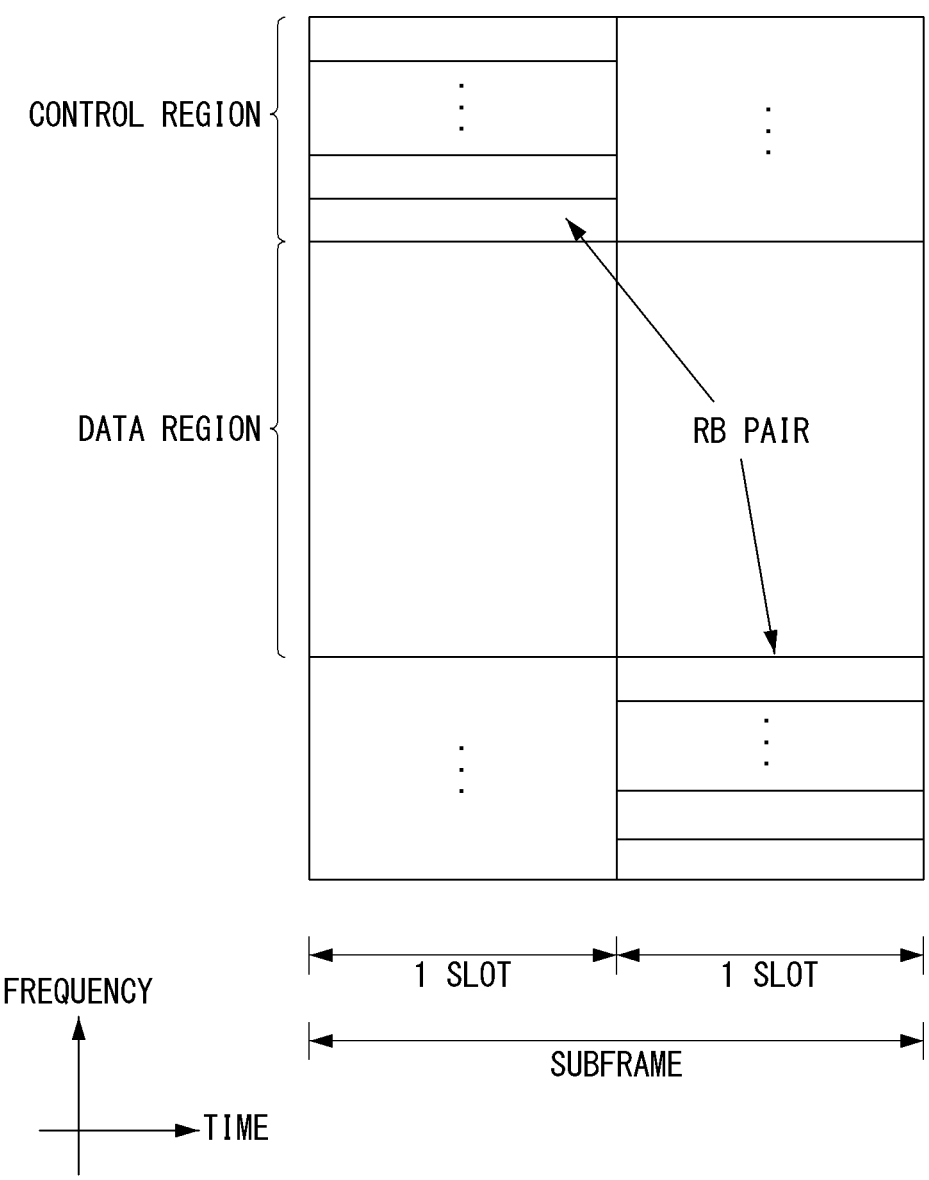

[FIG. 8]
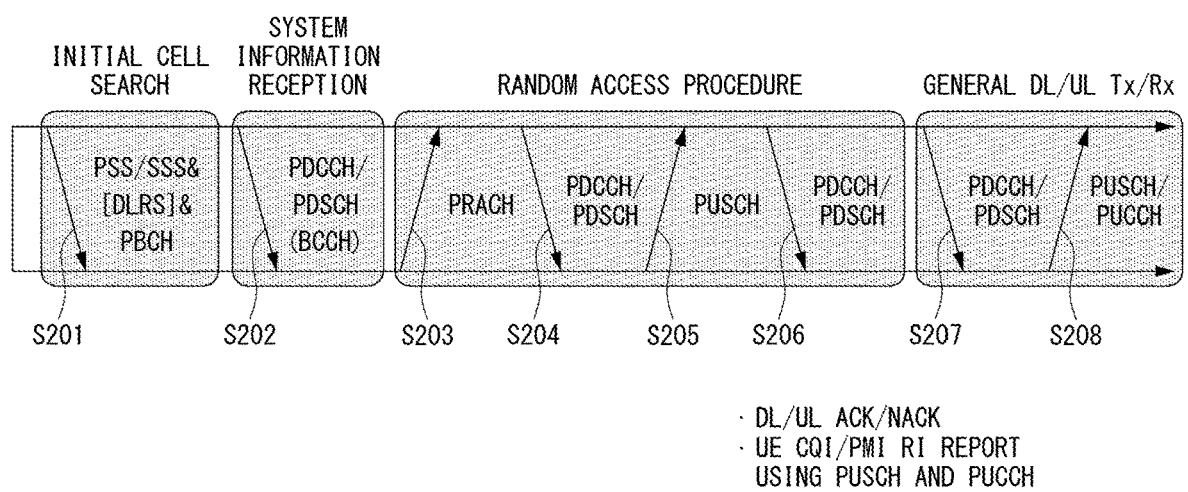

[FIG. 9]
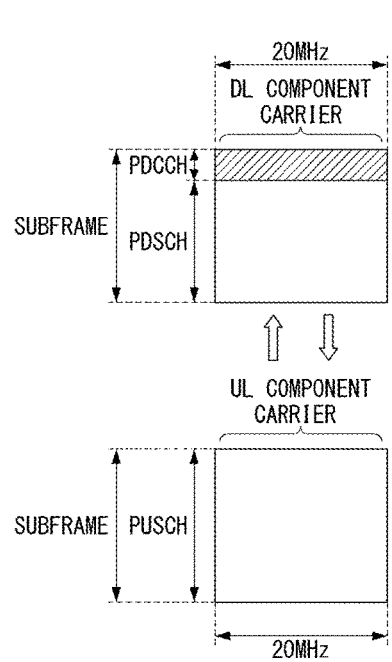
(a) SINGLE CC
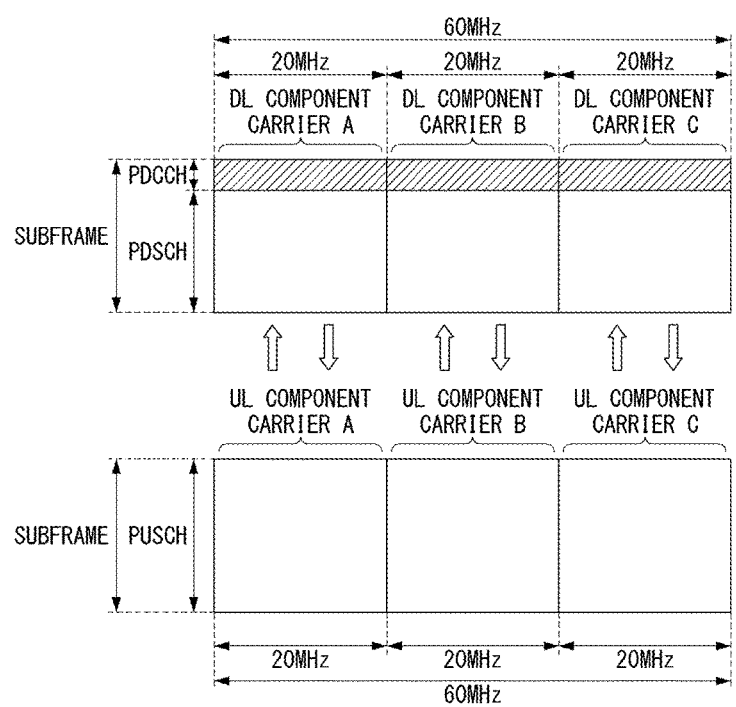
(b) MULTIPLE CC

[FIG. 10]
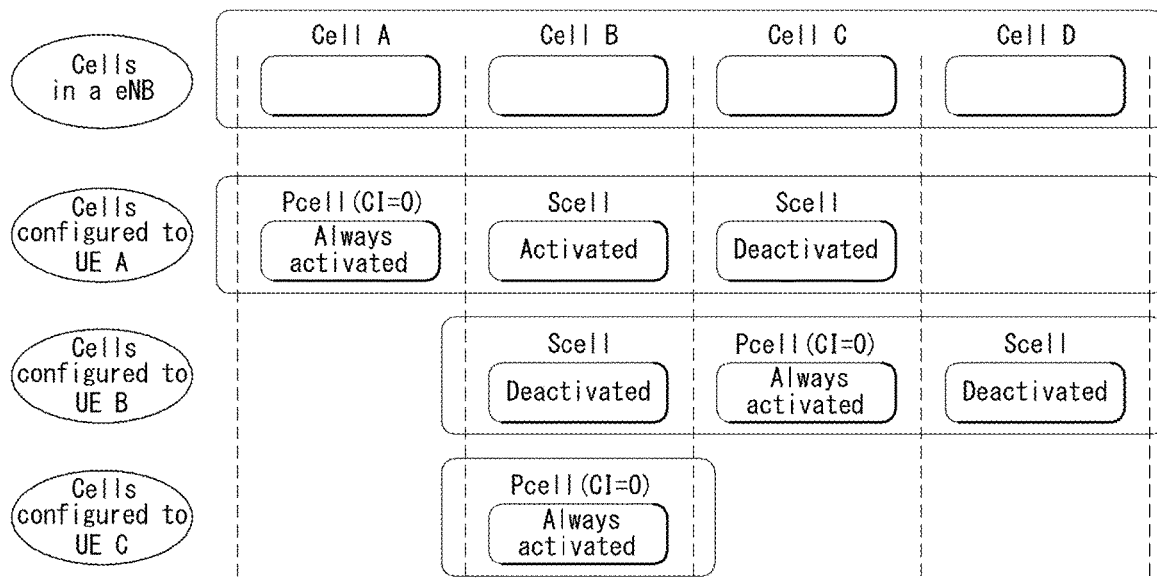
[FIG. 11]
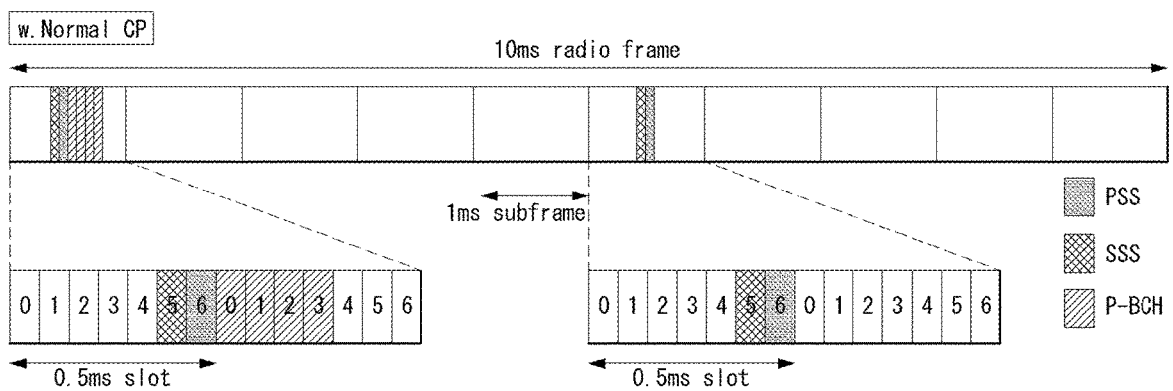

[FIG. 12]
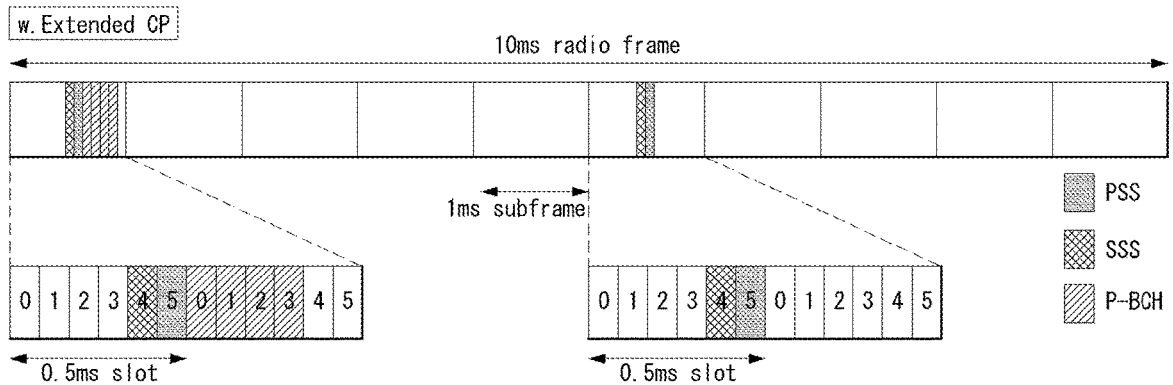
[FIG. 13]
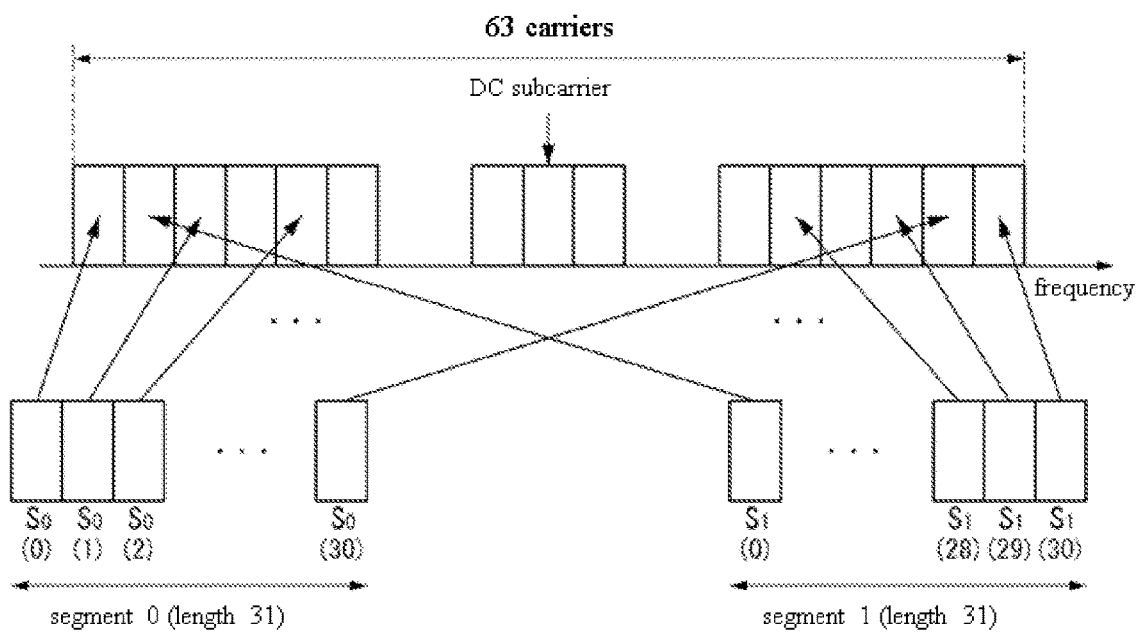

[FIG. 14]
(a) 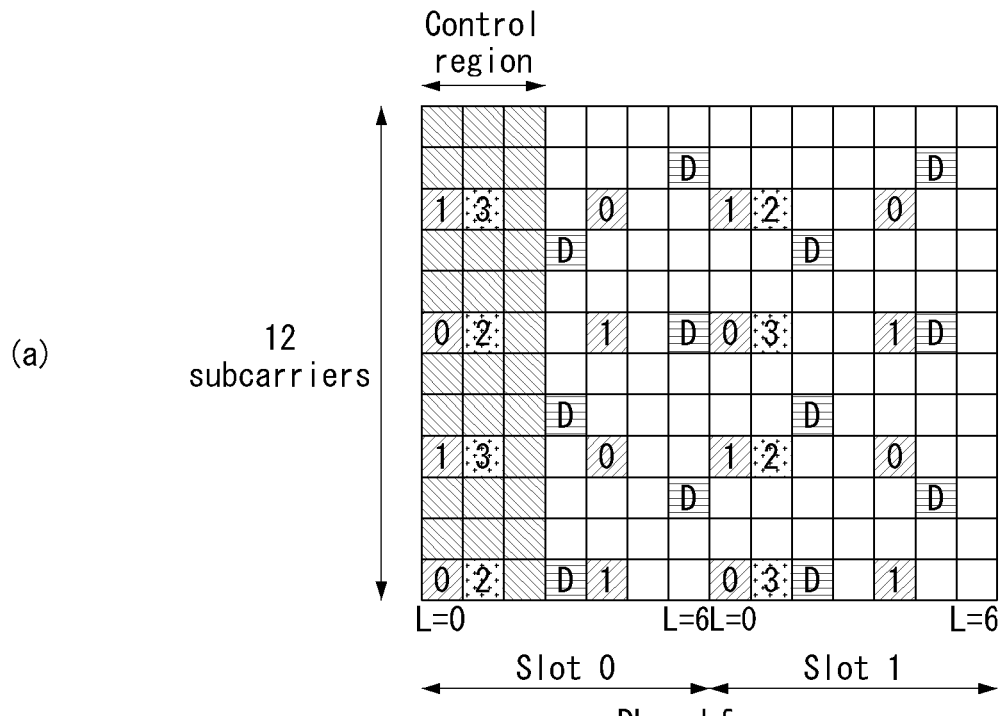
(b) 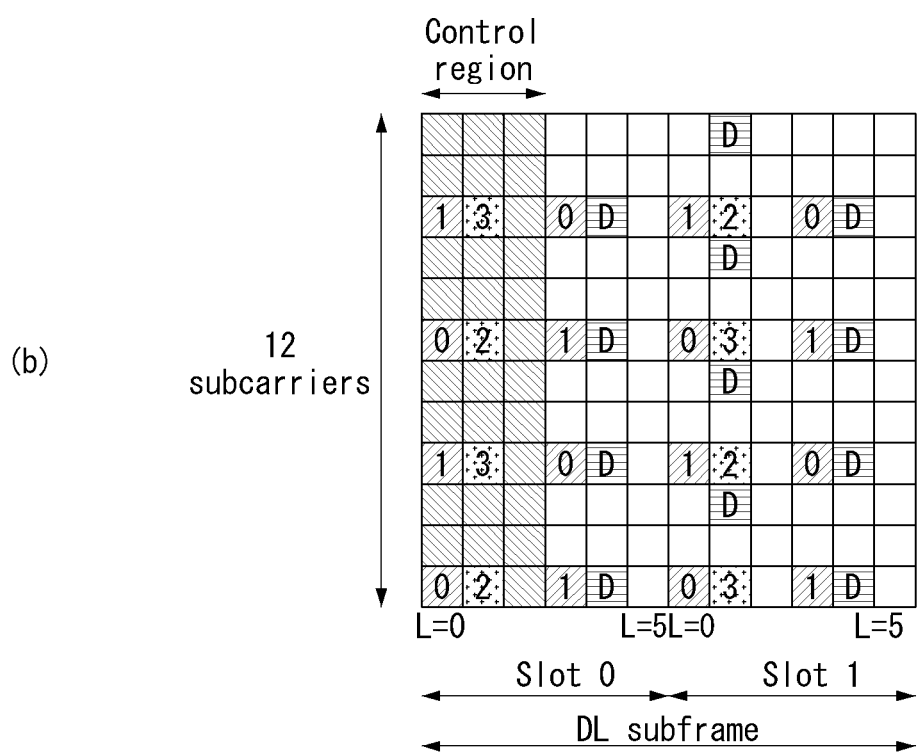

[FIG. 15]
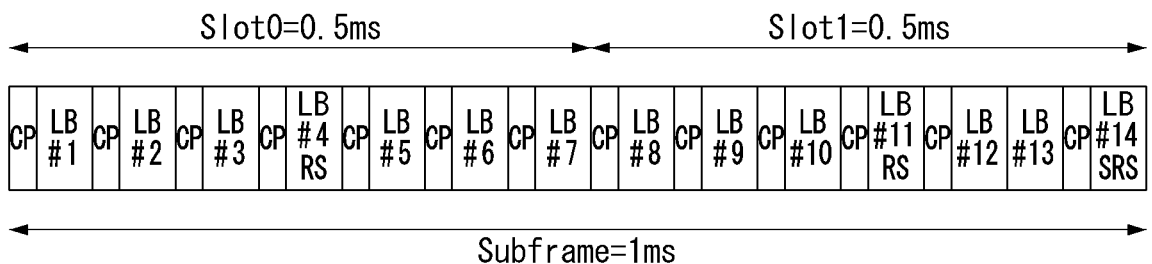
[FIG. 16]
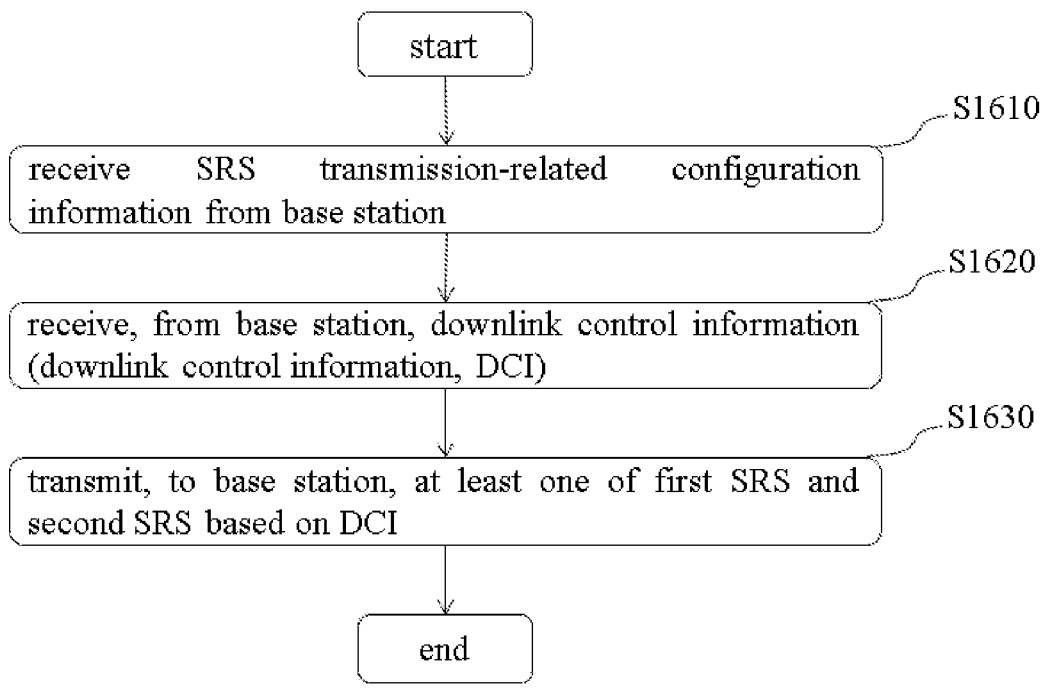

[FIG. 17]
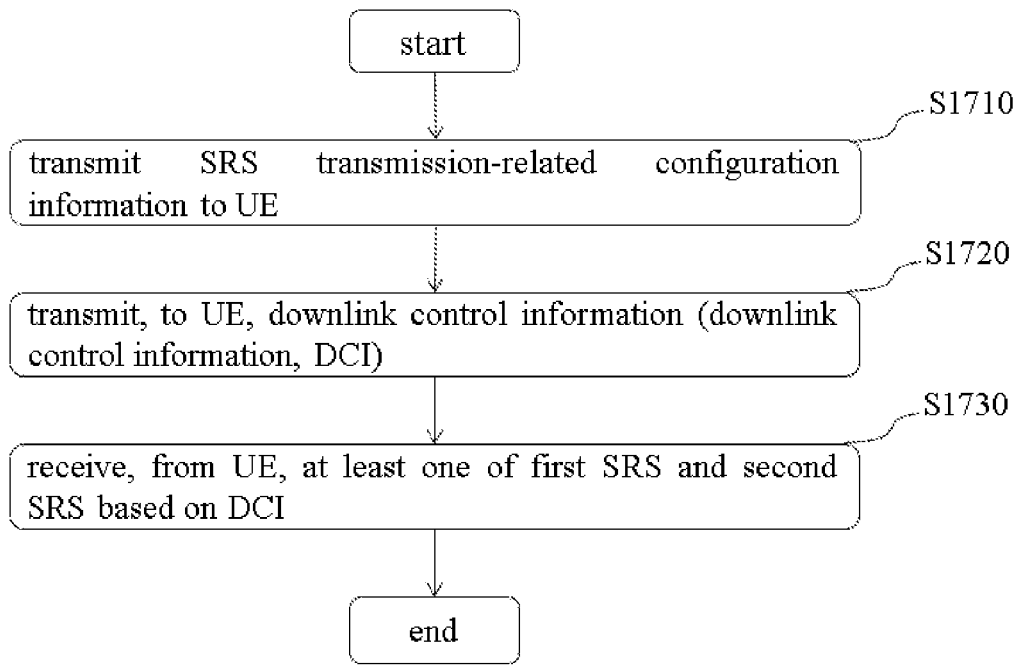

[FIG. 18]
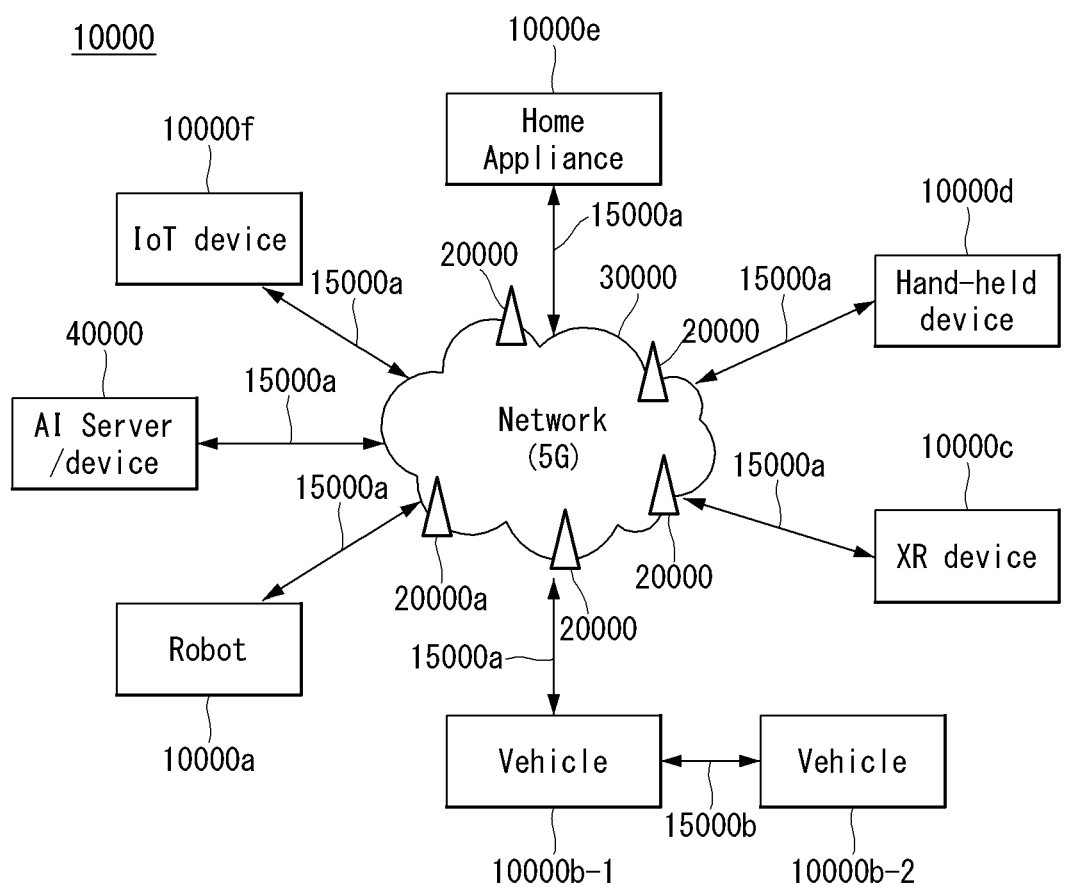

[FIG. 19]
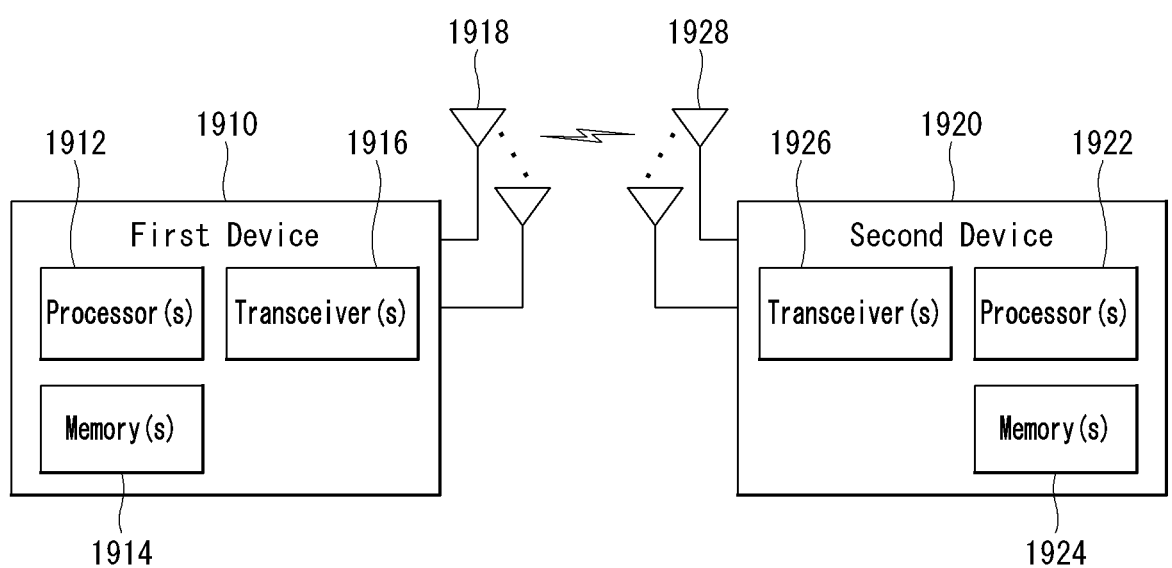

[FIG. 20]
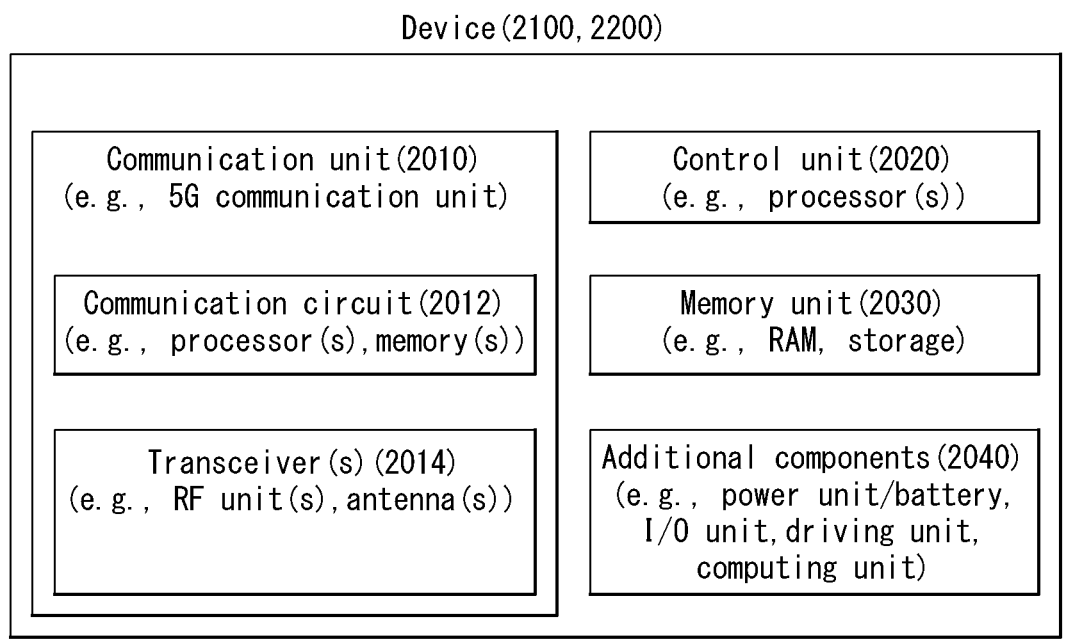

METHOD FOR TRANSMITTING SOUNDING REFERENCE SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/001847, filed on Feb. 10, 2020, which claims the benefit of KR Application No. 10-2019-0015146, filed on Feb. 8, 2019, the contents of which are all hereby incorporated by reference herein in their entirety.

TECHNICAL FIELD

The disclosure relates to a wireless communication system and relates to a method for transmitting a sounding reference signal and a device for the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DETAILED DESCRIPTION OF THE DISCLOSURE

Technical Problem

An object of the disclosure is to provide a method for transmitting a sounding reference signal (SRS).

Another object of the disclosure is to provide a method for transmitting an additional in addition to legacy SRS transmission.

Another object of the disclosure is to provide a method for resolving a collision between a PUSCH and/or PUCCH and an additional SRS transmission in transmitting an additional SRS.

Objects of the disclosure are not limited to the foregoing, and other unmentioned objects would be apparent to one of ordinary skill in the art from the following description.

Technical Solution

The disclosure provides a method for transmitting a sounding reference signal (SRS) in a wireless communication system.

Specifically, the method performed by the UE comprises receiving configuration information related to SRS transmission from a base station, the configuration information including a first parameter set related to first SRS transmission and a second parameter set related to second SRS transmission, receiving downlink control information (DCI) from the base station, the DCI including at least one of first trigger information for transmission of a first SRS and second trigger information for transmission of a second SRS, and transmitting at least one of the first SRS and the second SRS to the base station, based on the DCI, wherein the first SRS and the second SRS are transmitted using the same subframe, and wherein the first SRS is transmitted based on the first trigger information mapped with the first parameter set, and the second SRS is transmitted based on the second trigger information mapped with the second parameter set.

Further, in the disclosure, the first SRS is transmitted using a 14th symbol of the subframe, and the second SRS is transmitted using one or more symbols among remaining symbols except for the symbol used for transmission of the first SRS of the subframe.

Further, in the disclosure, the first trigger information and the second trigger information are included in an SRS request field of the DCI, and the first trigger information and the second trigger information are represented as a codepoint value indicated by the SRS request field.

Further, in the disclosure, the first SRS and the second SRS are aperiodic SRSs.

Further, in the disclosure, when the codepoint value is '01', only the first SRS may be transmitted, and when the codepoint value is '10', both the first SRS and the second SRS may be transmitted.

Further, in the disclosure, the DCI further includes a field indicating rate matching of a PUSCH transmitted on the subframe.

Further, in the disclosure, a format of the DCI is any one of DCI formats 0B, 3B, 4, 4A, 4B and 7-0B.

Further, in the disclosure, transmitting at least one of the first SRS and the second SRS to the base station based on the DCI includes, when a plurality of serving cells are configured to the UE, independently transmitting, to the base station, at least one of the first SRS and the second SRS in each serving cell, based on the DCI.

Further, in the disclosure, a user equipment (UE) transmitting a sounding reference signal (SRS) in a wireless communication system comprises one or more transceivers, one or more processors, and one or more memories storing instructions for operations executed by the one or more processors and connected with the one or more processors, wherein the operations include receiving configuration information related to SRS transmission from a base station, the configuration information including a first parameter set related to first SRS transmission and a second parameter set related to second SRS transmission, receiving downlink control information (DCI) from the base station, the DCI including at least one of first trigger information for transmission of a first SRS and second trigger information for transmission of a second SRS, and transmitting at least one of the first SRS and the second SRS to the base station, based on the DCI, wherein the first SRS and the second SRS are transmitted using the same subframe, and wherein the first SRS is transmitted based on the first trigger information mapped with the first parameter set, and the second SRS is transmitted based on the second trigger information mapped with the second parameter set.

Further, in the disclosure, the first SRS is transmitted using a 14th symbol of the subframe, and the second SRS is transmitted using one or more symbols among remaining symbols except for the symbol used for transmission of the first SRS of the subframe.

Further, in the disclosure, the first trigger information and the second trigger information are included in an SRS request field of the DCI, and the first trigger information and the second trigger information are represented as a code-point value indicated by the SRS request field.

Further, in the disclosure, a method for receiving a sounding reference signal (SRS) by a base station (BS) in a wireless communication system comprises transmitting configuration information related to SRS transmission to a user equipment (UE), the configuration information including a first parameter set related to first SRS transmission and a second parameter set related to second SRS transmission, transmitting downlink control information (DCI) to the UE, the DCI including at least one of first trigger information for transmission of a first SRS and second trigger information for transmission of a second SRS, and receiving at least one of the first SRS and the second SRS transmitted based on the DCI, from the UE, wherein the first SRS and the second SRS are transmitted using the same subframe, and wherein the first SRS is transmitted based on the first trigger information mapped with the first parameter set, and the second SRS is transmitted based on the second trigger information mapped with the second parameter set.

Further, in the disclosure, a base station (BS) receiving a sounding reference signal (SRS) in a wireless communication system comprises one or more transceivers, one or more processors, and one or more memories storing instructions for operations executed by the one or more processors and connected with the one or more processors, wherein the operations include receiving configuration information related to SRS transmission to a user equipment (UE), the configuration information including a first parameter set related to first SRS transmission and a second parameter set related to second SRS transmission, transmitting downlink control information (DCI) to the UE, the DCI including at least one of first trigger information for transmission of a first SRS and second trigger information for transmission of a second SRS, and receiving at least one of the first SRS and the second SRS transmitted based on the DCI, from the UE, wherein the first SRS and the second SRS are transmitted using the same subframe, and wherein the first SRS is transmitted based on the first trigger information mapped with the first parameter set, and the second SRS is transmitted based on the second trigger information mapped with the second parameter set.

Further, in the disclosure, in a device including one or more memories and one or more processors functionally connected with the one or more memories, the one or more processors enable the device to receive configuration information related to SRS transmission from a base station, the configuration information including a first parameter set related to first SRS transmission and a second parameter set related to second SRS transmission, receive downlink control information (DCI) from the base station, the DCI including at least one of first trigger information for transmission of a first SRS and second trigger information for transmission of a second SRS, and transmit at least one of the first SRS and the second SRS to the base station, based on the DCI, wherein the first SRS and the second SRS are transmitted using the same subframe, and wherein the first SRS is transmitted based on the first trigger information mapped with the first parameter set, and the second SRS is transmitted based on the second trigger information mapped with the second parameter set.

Further, in the disclosure, in one or more non-transitory computer-readable media storing one or more instructions executable by one or more processors, the one or more instructions instruct a user equipment to receive configuration information related to SRS transmission from a base station, the configuration information including a first parameter set related to first SRS transmission and a second parameter set related to second SRS transmission, receive downlink control information (DCI) from the base station, the DCI including at least one of first trigger information for transmission of a first SRS and second trigger information for transmission of a second SRS, and transmit at least one of the first SRS and the second SRS to the base station, based on the DCI, wherein the first SRS and the second SRS are transmitted using the same subframe, and wherein the first SRS is transmitted based on the first trigger information mapped with the first parameter set, and the second SRS is transmitted based on the second trigger information mapped with the second parameter set.

Advantageous Effects

The disclosure provides a method for transmitting an additional SRS in addition to legacy SRS) transmission in transmitting a sounding reference signal (SRS), thereby enabling more efficient SRS transmission.

The disclosure provides a method for resolving a collision between PUSCH and/or PUCCH and additional SRS transmission in transmitting an additional SRS in addition to legacy SRS transmission, thereby enabling efficient SRS transmission.

Effects of the disclosure are not limited to the foregoing, and other unmentioned effects would be apparent to one of ordinary skill in the art from the following description.

BRIEF DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates an AI device according to an embodiment of the disclosure.

FIG. 2 illustrates an AI server according to an embodiment of the disclosure.

FIG. 3 illustrates an AI system according to an embodiment of the disclosure.

FIG. 4 shows the structure of a radio frame in a wireless communication system to which an embodiment of the disclosure may be applied.

FIG. 5 is a diagram illustrating a resource grid for one downlink slot in a wireless communication system to which an embodiment of the disclosure may be applied.

FIG. 6 shows the structure of a downlink subframe in a wireless communication system to which an embodiment of the disclosure may be applied.

FIG. 7 illustrates a structure of an uplink subframe in a wireless communication system to which the disclosure may be applied.

FIG. 8 is a view illustrating physical channels used in a wireless communication system and a general signal transmission method using the same, to which the disclosure may be applied.

FIG. 9 illustrates examples of a component carrier and carrier aggregation in a wireless communication system to which the disclosure may be applied.

FIG. 10 illustrates an example of a cell supporting carrier aggregation in a wireless communication system to which the disclosure may be applied.

FIG. 11 illustrates an example of a frame structure for synchronization signal transmission in a wireless communication system to which the disclosure may be applied.

FIG. 12 illustrates another example of a frame structure for synchronization signal transmission in a wireless communication system to which the disclosure may be applied.

FIG. 13 illustrates an example of a method in which two sequences in a logical region are interleaved and mapped in a physical region in a wireless communication system to which the disclosure may be applied.

FIG. 14 illustrates an example of a reference signal pattern mapped to a downlink resource block pair in a wireless communication system to which the disclosure may be applied.

FIG. 15 illustrates an uplink subframe including a sounding reference signal symbol in a wireless communication system to which the disclosure may be applied.

FIG. 16 is a flowchart illustrating an operational process in a UE transmitting a sounding reference signal according to an embodiment of the disclosure.

FIG. 17 is a flowchart illustrating an operational process in a base station transmitting a sounding reference signal according to an embodiment of the disclosure.

FIG. 18 illustrates a communication system applied to the disclosure.

FIG. 19 illustrates wireless devices applicable to the disclosure.

FIG. 20 illustrates another example of a wireless device to which methods proposed in the disclosure may be applied.

MODE FOR CARRYING OUT THE INVENTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA(Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

As used herein, the phrase "A and/or B" may have the same meaning as "including at least one of A or B."

Hereinafter, examples of 5G use scenarios to which the method proposed in the disclosure may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of megabits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 according to an embodiment of the disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

AI+XR

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100*a* interacting with the self-driving vehicle 100*b*.

The robot 100*a* having the self-driving function may collectively refer to devices that autonomously move along a given flow without control of a user or autonomously determine a flow and move.

The robot 100*a* and the self-driving vehicle 100*b* having the self-driving function may use a common sensing method in order to determine one or more of a moving path or a running plan. For example, the robot 100*a* and the self-driving vehicle 100*b* having the self-driving function may determine one or more of a moving path or a running plan using information sensed through LIDAR, a radar, a camera, etc.

The robot 100*a* interacting with the self-driving vehicle 100*b* is present separately from the self-driving vehicle 100*b*, and may perform an operation associated with a self-driving function inside or outside the self-driving vehicle 100*b* or associated with a user got in the self-driving vehicle 100*b*.

In this case, the robot 100*a* interacting with the self-driving vehicle 100*b* may control or assist the self-driving function of the self-driving vehicle 100*b* by obtaining sensor information in place of the self-driving vehicle 100*b* and providing the sensor information to the self-driving vehicle 100*b*, or by obtaining sensor information, generating surrounding environment information or object information, and providing the surrounding environment information or object information to the self-driving vehicle 100*b*.

Alternatively, the robot 100*a* interacting with the self-driving vehicle 100*b* may control the function of the self-driving vehicle 100*b* by monitoring a user got in the self-driving vehicle 100*b* or through an interaction with a user. For example, if a driver is determined to be a drowsiness state, the robot 100*a* may activate the self-driving function of the self-driving vehicle 100*b* or assist control of the driving unit of the self-driving vehicle 100*b*. In this case, the function of the self-driving vehicle 100*b* controlled by the robot 100*a* may include a function provided by a navigation system or audio system provided within the self-driving vehicle 100*b*, in addition to a self-driving function simply.

Alternatively, the robot 100*a* interacting with the self-driving vehicle 100*b* may provide information to the self-driving vehicle 100*b* or may assist a function outside the self-driving vehicle 100*b*. For example, the robot 100*a* may provide the self-driving vehicle 100*b* with traffic information, including signal information, as in a smart traffic light, and may automatically connect an electric charger to a filling inlet through an interaction with the self-driving vehicle 100*b* as in the automatic electric charger of an electric vehicle.

AI+Robot+XR

An AI technology and an XR technology are applied to the robot 100*a*, and the robot 100*a* may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Overview of a System to which the Disclosure May be Applied

FIG. 4 shows the structure of a radio frame in a wireless communication system to which an embodiment of the disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$ in FIG. 4. A UL and DL transmission includes the radio frame having a duration of $T\_f=307200*T\_s=10$ ms.

(a) of FIG. 4 exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission in the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

(b) of FIG. 4 shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point when the downlink is changed to the uplink or a point when the uplink is switched to the downlink is referred to as a switching point. Switch-point periodicity means a period in which an aspect in which the uplink subframe and the downlink subframe are switched is similarly repeated and both 5 ms and 10 ms are supported. When the downlink-downlink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and the subframe and a subframe immediately following the subframe are always periods for the uplink transmission.

The uplink-downlink configuration as system information may be known by both the base station and the UE. The base station transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and as broadcast information may be commonly transmitted to all UEs in a cell through a broadcast channel.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of a radio subframe according to the example of FIG. 4 is just an example, and the number of subcarriers included in a radio frame, the number of slots included in a subframe and the number of OFDM symbols included in a slot may be changed in various manners.

FIG. 5 is a diagram illustrating a resource grid for one downlink slot in a wireless communication system to which an embodiment of the disclosure may be applied.

Referring to FIG. 5, one downlink slot includes a plurality of OFDM symbols in a time domain. It is described herein that one downlink slot includes 7 OFDMA symbols and one resource block includes 12 subcarriers for exemplary purposes only, and the disclosure is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 6 shows the structure of a downlink subframe in a wireless communication system to which an embodiment of the disclosure may be applied.

Referring to FIG. 6, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARD). Control information transmitted in a PDCCH is called Downlink Control Information (DCI). DCI includes uplink resource allocation information, downlink resource allocation information, or an uplink transmission (Tx) power control command for a specific UE group.

The PDCCH may carry resource allocation and a transmission format (also referred to as a downlink (DL) grant) of a downlink-shared channel (DL-SCH), resource allocation information (also referred to as an uplink (UL) grant) of an uplink shared channel (UL-SCH), paging information on a paging channel (PCH), system information on the DL-SCH, resource allocation of an upper layer control message such as a random access response transmitted on a PDSCH, activation of a set of transmission power control (TPC) commands for individual UEs in a predetermined UE group and a voice over Internet protocol (VoIP), and the like. A plurality of PDCCHs may be transmitted in the control region and the UE may monitor the plurality of PDCCHs. The PDCCH is configured by one control channel element or a set of a plurality of consecutive control channel elements (CCEs). The CCE is a logical allocation unit used for providing a coding rate depending on a state of a radio channel to the PDCCH. The CCE corresponds to a plurality of resource element groups. A format of the PDCCH and the number of bits of the PDCCH available are determined according to an association relationship between the number of CCEs and the coding rate provided by the CCEs.

The eNB decides a PDCCH format according to the DCI to be sent to the UE and attaches cyclic redundancy check (CRC) to the control information. The CRC is masked with a radio network temporary identifier (RNTI) according to an owner or a purpose of the PDCCH. The CRC may be masked with a unique identifier (e.g., cell-RNTI (C-RNTI)) of the UE in the case of the PDCCH for a specific UE. Alternatively, in the case of the PDCCH for the paging message, the CRC may be masked with a paging indication identifier (e.g., paging-RNTI (P-RNTI)). In the case of the PDCCH for system information, more specifically, a system information block (SIB), the CRC may be masked with a system information-RNTI (SI-RNTI). The CRC may be masked with a random access-RNTI (RA-RNTI) in order to indicate a random access response which is a response to transmission of a random access preamble of the UE.

The enhanced PDCCH (EPDCCH) carries UE-specific signaling. The EPDCCH is located in a UE-specifically configured physical resource block (PRB). In other words, although the PDCCH may be transmitted in up to first three OFDM symbols in the first slot in the subframe as set forth above, the EPDCCH may be transmitted in a resource region other than the PDCCH. The point (i.e., symbol) where the EPDCCH starts in the subframe may be configured in the UE via higher layer signaling (e.g., RRC signaling).

The EPDCCH may carry the transmission format related to DL-SCH, resource allocation and HARQ information, transmission format related to UL-SCH, resource allocation and HARQ information, and resource allocation information related to sidelink shared channel (SL-SCH) and physical sidelink control channel (PSCCH). Multiple EPDCCHs may be supported. The UE may monitor the EPCCH's set.

The EPDCCH may be transmitted by way of one or more consecutive enhanced CCEs (ECCEs), and the number of ECCEs per EPDCCH may be determined depending on each EPDCCH format.

Each ECCE may consist of a plurality of enhanced resource element groups (EREGs). The EREG is used to define mapping of ECCE to RE. There are 16 EREGs per PRB pair. Apart from the RE carrying the DMRS in each PRB pair, all the REs are numbered from 0 to 15 in ascending order of frequency and then in ascending order of time.

The UE may monitor the plurality of EPDCCHs. For example, one or two EPDCCH sets may be configured in one PRB pair in which the UE monitors EPDCCH transmission.

Different coding rates for EPCCH may be realized by merging different numbers of ECCEs. The EPCCH may use localized transmission or distributed transmission and, thus, mapping of ECCE to RE in PRB may be varied.

FIG. 7 illustrates a structure of an uplink subframe in a wireless communication system to which the disclosure may be applied.

Referring to FIG. 7, the uplink subframe may be divided into a control region and a data region in the frequency domain. The physical uplink control channel (PUCCH) carrying uplink control information is allocated in the control region. The physical uplink shared channel (PUSCH) carrying user data is allocated in the data region. To maintain the single carrier properties, one UE does not simultaneously transmit PUCCH and PUSCH.

The PUCCH for one UE is assigned a resource block (RB) pair in the subframe. The RBs in the RB pair occupy different subcarriers in each of the two slots. This is referred to as the RB pair allocated to the PUCCH frequency hopping at the slot boundary.

FIG. 8 is a view illustrating physical channels used in a wireless communication system and a general signal transmission method using the same, to which the disclosure may be applied.

Referring to FIG. 8, in a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S201). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S202).

Meanwhile, when there is no radio resource first accessing the eNB or for signal transmission, the UE may perform a Random Access Procedure (RACH) to the eNB (S203 to S206). To this end, the UE may transmit a specific sequence to a preamble through a Physical Random Access Channel (PRACH) (S203 and S205) and receive a response message (Random Access Response (RAR) message) for the preamble through the PDCCH and a corresponding PDSCH. In the case of a contention based RACH, a Contention Resolution Procedure may be additionally performed (S206).

The UE that performs the above procedure may then perform PDCCH/PDSCH reception (S207) and Physical Uplink Shared Channel (PUSCH)/Physical Uplink Control Channel (PUCCH) transmission (S208) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Meanwhile, as more and more communication devices need larger communication capacity, a need is surfacing for mobile broadband communication enhanced over conventional radio access technology. Massive machine type communication (MTC) becomes a major issue as considered for next-generation communication, which connects multiple devices and things anytime, anywhere to provide various services. Also under discussion is a communication system design considering services/UEs sensitive to reliability and latency. As such, there is ongoing discussion for next-generation radio access technology considering, e.g., enhanced mobile broadband communication, massive MTC, and ultra-reliable and low latency communication (URLLC), which is referred to herein as new RAT for convenience.

NR

As more and more communication devices need larger communication capacity, a need is surfacing for mobile broadband communication enhanced over conventional radio access technology. Massive machine type communication (MTC) becomes a major issue as considered for next-generation communication, which connects multiple devices and things anytime, anywhere to provide various services. Also under discussion is a communication system design considering services/UEs sensitive to reliability and latency. As such, there is ongoing discussion for next-generation radio access technology considering, e.g., enhanced mobile broadband communication, massive MTC, and ultra-reliable and low latency communication (URLLC), which is referred to herein as NR for convenience.

OFDM Numerology

The new RAT system uses an OFDM transmission scheme or a similar transmission scheme. The new RAT system may follow OFDM parameters different from those of LTE. Alternatively, the new RAT system follows the legacy LTE/LTE-A neurology as it is, but may have a larger system bandwidth (e.g., 100 MHz). Alternatively, one cell may support a plurality of neurologies. That is, UEs operating in different neurologies may coexist in one cell.

Bandwidth Part (BWP)

In the NR system, up to 400 MHz per component carrier (CC) may be supported. If the UE operating in such a wideband CC always operates with the RF for the entire CC turned on, the UE battery consumption may increase. Alternatively, when considering several use cases (e.g., eMBB, URLLC, mMTC, etc.) operating in one wideband CC, a different numerology (e.g., sub-carrier spacing) may be supported for each frequency band within the CC. Or, the capability for the maximum bandwidth may be different for each UE. In consideration of this, the base station may instruct the UE to operate only in a part of the bandwidth rather than the entire bandwidth of the wideband CC, and the part of the bandwidth is defined as a bandwidth part (BWP) for convenience. The BWP may be composed of contiguous resource blocks (RBs) on the frequency axis and may correspond to one numerology (e.g., sub-carrier spacing, CP length, slot/mini-slot duration).

Meanwhile, the base station may configure multiple BWPs even within one CC configured in the UE. For example, in the PDCCH monitoring slot, a BWP occupying a relatively small frequency domain may be configured, and the PDSCH indicated by the PDCCH may be scheduled on a larger BWP. Alternatively, when UEs are concentrated in a specific BWP, some UEs may be configured to have different BWPs for load balancing. Alternatively, considering frequency domain inter-cell interference cancellation between neighboring cells, some spectra of the total bandwidth may be excluded and the BWPs on both sides may be configured within the same slot. That is, the base station may configure at least one DL/UL BWP in the UE associated with the wideband CC and, at a specific time point, activate at least one DL/UL BWP of the configured DL/UL BWP(s) (via, e.g., L1 signaling or MAC CE or RRC signaling), and if a switching may be indicated via other configured DL/UL BWP (via, e.g., L1 signaling or MAC CE or RRC signaling) or the timer expires, switching may be done with a predetermined DL/UL BWP. In this case, the activated DL/UL BWP is defined as the active DL/UL BWP. However, in situations, such as when the UE is in the initial access process or before an RRC connection is set up, the UE may fail to receive the configuration for the DL/UL BWP and, in such a circumstance, the DL/UL BWP assumed by the UE is defined as the initial active DL/UL BWP.

Overview of Carrier Aggregation

The communication environments considered in the embodiments of the disclosure include all multi-carrier supporting environments. In other words, as used herein, 'multi-carrier system' or 'carrier aggregation (CA) system' refers to a system in which one or more component carriers (CCs) having a smaller bandwidth than a target bandwidth are aggregated and used in configuring the target bandwidth so as to support a wide band.

As used herein, 'multi-carrier' means aggregation of carriers (or carrier aggregation), and 'carrier aggregation' means not only aggregation of contiguous carriers but also aggregation of non-contiguous carriers. The number of component carriers aggregated may be set to differ between downlink and uplink. When the number of downlink component carriers (hereinafter, 'DL CCs') and the number of uplink component carriers (hereinafter, 'UL CCs') are the same is referred to as symmetric aggregation, and when the numbers differ from each other is referred to as asymmetric aggregation. Carrier aggregation may be interchangeably used with carrier aggregation, bandwidth aggregation, or spectrum aggregation.

Carrier aggregation of two or more component carriers aims to support up to 100 MHz bandwidth in the LTE-A system. When one or more carriers having smaller bandwidths than the target bandwidth, the bandwidths of the carriers aggregated may be limited to bandwidths used in the legacy system to maintain backward compatibility with the legacy IMT system. For example, the legacy 3GPP LTE system supports the {1.4, 3, 5, 10, 15, 20} MHz bandwidth, and the 3GPP LTE-advanced system (i.e., LTE-A) may be limited to support bandwidths larger than 20 MHz using only the above-enumerated bandwidths for compatibility with the legacy system. Further, the carrier aggregation system used in the disclosure may support carrier aggregation by defining a new bandwidth regardless of the bandwidths used in the legacy system.

The LTE-A system uses the concept of a cell to manage radio resources.

The above-described carrier aggregation environment may be referred to as a multiple cell environment. A cell is defined as a combination of a pair of downlink resource (DL CC) and uplink resource (UL CC), but uplink resources are not essential. Accordingly, a cell may be configured with a downlink resource alone or a downlink resource and an uplink resource. When a specific UE has only one configured serving cell, the UE may have one DL CC and one UL CC. However, when a specific UE has two or more configured serving cells, the UE may have as many DL CCs as the number of cells CC and a number of UL CCs which is equal to or smaller than the number of cells.

Alternatively, the UE may be configured with DL CCs and UL CCs in the opposite manner. In other words, when a specific UE has a plurality of configured serving cells, a carrier aggregation environment in which UL CCs are more than DL CCs may also be supported. In other words, carrier aggregation may be understood as aggregation of two or more cells having different carrier frequencies (center frequencies of cells). Here, the term 'cell' should be distinguished from the term 'cell' typically referring to an area covered by the base station.

Cells used in the LTE-A system include a primary cell (PCell) and a secondary cell (SCell). The PCell and the SCell may be used as serving cells. A UE, which is in the RRC_CONNECTED state but is not configured with carrier aggregation or does not support carrier aggregation, has only one serving cell configured with only P cell. A UE, which is in the RRC_CONNECTED state and is configured with carrier aggregation, may have one or more serving cells which include a P cell and one or more S cells.

A serving cell (P cell and S cell) may be configured via an RRC parameter. PhysCellId is the physical layer identifier of the cell and has an integer value from 0 to 503. SCellIndex is a short identifier used to identify the SCell and has an integer value from 1 to 7. ServCellIndex is a short identifier used to identify the serving cell (Pcell or Scell) and has an integer value from 0 to 7. 0 is applied to the Pcell, and the SCellIndex is previously assigned to be applied to the Scell. In other words, a cell having the smallest cell ID (or cell index) in the ServCellIndex becomes the PCell.

P cell refers to a cell operating on a primary frequency (or primary CC). The P cell may be used to perform an initial connection establishment process or a connection re-establishment process, and may refer to a cell indicated in the handover process. Further, PCell refers to a cell that becomes the center of control-related communication among serving cells configured in a carrier aggregation environment. In other words, the UE may receive PUCCH and perform transmission only via its own PCell, and may use only the PCell to obtain system information or change a monitoring procedure. Evolved Universal Terrestrial Radio Access (E-UTRAN) may change only the PCell for a handover procedure using an RRC connection reconfiguration (RRCConnectionReconfiguration) message of higher layer including mobility control information (mobilityControlInfo), for the UE supporting the carrier aggregation environment.

SCell may refer to a cell operating on a secondary frequency (or secondary CC). For a specific UE, only one PCell is assigned, and one or more SCells may be assigned. An SCell may be configured after an RRC connection is configured and be used to provide an additional radio resource. The other cells, i.e., SCells, except for the PCell among the serving cells configured in the carrier aggregation environment lack PUCCH. Upon adding an SCell to the UE supporting the carrier aggregation environment, E-UTRAN may provide all system information related to the operation of the relevant cell, which is the RRC_CONNECTED state, via a specific signal (dedicated signal). A change to the system information may be controlled by releasing and adding a relevant SCell and, in this case, a higher layer RRC connection reconfiguration (RRCConnectionReconfiguration) message may be used. E-UTRAN may performing dedicated signaling having a different parameter per UE, rather than broadcasting in the relevant SCell.

After an initial security activation processor begins, E-UTRAN may configure a network including one or more SCells by adding to the PCell initially configured in the connection establishment process. In the carrier aggregation environment, the PCell and the SCell may operate as individual component carriers. In the following embodiments, primary component carrier (PCC) may be used in the same meaning as the PCell, and secondary component carrier (SCC) may be used in the same meaning as the Scell.

FIG. 9 illustrates examples of a component carrier and carrier aggregation in a wireless communication system to which the disclosure may be applied.

(a) of FIG. 9 illustrates a single carrier structure used in the LTE system. Component carriers include DL CCs and UL CCs. One component carrier may have a frequency range of 20 MHz.

(b) of FIG. 9 illustrates a carrier aggregation structure used in the LTE_A system. (b) of FIG. 9 illustrates an example in which three component carriers having a frequency size of 20 MHz are combined. There are three DL CCs and three UL CCs, but the numbers of DL CCs and UL CCs are not limited thereto. In the case of carrier aggregation, the UE may simultaneously monitor three CCs, receive downlink signals/data, and transmit uplink signals/data.

If N DL CCs are managed in a specific cell, the network may allocate M (M≤N) DL CCs to the UE. In this case, the UE may monitor only M limited DL CCs and receive a DL signal. Further, the network may allocate main DL CCs to the UE by giving priority to L (L≤M≤N) DL CCs. In this case, the UE must monitor the L DL CCs. This method may be equally applied to uplink transmission.

Linkage between the carrier frequency (or DL CC) of the downlink resource and the carrier frequency (or UL CC) of the uplink resource may be indicated by a higher layer message, such as an RRC message or system information. For example, a combination of a DL resource and a UL resource may be configured by a linkage defined by system information block type2 (SIB2). Specifically, the linkage may mean a mapping relationship between a DL CC through which a PDCCH carrying a UL grant is transmitted and a UL CC using the UL grant or may mean a mapping relationship between a DL CC (or UL CC) through which data for HARQ is transmitted and a UL CC (or DL CC) through which an HARQ ACK/NACK signal is transmitted.

FIG. 10 illustrates an example of a cell supporting carrier aggregation in a wireless communication system.

Referring to FIG. 10, configured cells are cells rendered to be carrier-aggregated based on a measurement report among the cells of the base station and may be configured per UE. The configured cell may previously reserve a resource for ack/nack transmission for PDSCH transmission. An activated cell is a cell configured to actually transmit a PDSCH/PUSCH among the configured cells, and reports channel state information (CSI) for PDSCH/PUSCH transmission and transmits a sounding reference signal (SRS). A deactivated cell is a cell rendered not to perform PDSCH/PUSCH transmission by a command from the base station or operation of a timer and may stop CSI reporting and SRS transmission.

Synchronization Signal/Sequence (SS)

SSs include primary (P)-SSs and secondary (S)-SSs and are signals used upon cell search.

FIG. 11 is a view illustrating a frame structure used for SS transmission in a system using a normal cyclic prefix (CP). FIG. 12 is a view illustrating a frame structure used for SS transmission in a system using an extended CP.

For easier inter-radio access technology (RAT) measurement, SSs are transmitted in the respective second slots of subframe 0 and subframe 5 considering the global system for mobile communications (GSM) frame length, 4.6 ms, and the boundary for the radio frame may be detected vis S-SS. P-SS is transmitted in the last OFDM symbol of the slot, and S-SS is transmitted in the OFDM symbol immediately ahead of the P-SS.

SS may transmit a total of 504 physical layer cell identifiers (physical cell ID) by combinations of three P-SSs and 168 S-SSs. Further, SS and PBCH are transmitted in middle 6 RBs in the system bandwidth and may be detected or decoded by the UE regardless of transmission bandwidth.

The transmission diversity scheme of SS uses only single antenna port and is not separately defined in the standards. In other words, the transmission diversity scheme of SS may use single antenna transmission or UE-transparent transmission scheme (e.g., PVS(Precoder Vector Switching), TSTD (Time-Switched Transmit Diversity), CDD(Cyclic-Delay Diversity)).

1. P-SS Code

A Zadoff-Chu (ZC) sequence with a length of 63 is defined in the frequency domain and may be used as sequence of P-SS. The ZC sequence is defined by Equation 1, and the sequence element, n=31, which corresponds to DC subcarrier, is punctured. In Equation 1, N_zc=63.

$$d_u(n) = e^{-j\frac{\pi u n(n+1)}{N_{ZC}}}$$ [Equation 1]

Among the 6 RBs (=7 subcarriers) positioned in the middle of the frequency range, 9 remaining subcarriers are transmitted always as 0, and facilitate design of a filter for synchronization. To define a total of three P-SSs, u=25, 29, and 34 may be used in Equation 1. In this case, since 29 and 34 have a relationship of conjugate symmetry, two correlations may be simultaneously performed. Here, conjugate symmetry means the relationship shown in Equation 2, and a one-shot correlator for u=29 and 34 may be implemented using the trait, and the overall computation load may be reduced by about 33.3%.

$$d_u(n)=(-1)^n(d_{N_{ZC}-u}(n))^*, \text{ when } N_{ZC} \text{ is even number.}$$

$$d_u(n)=(d_{N_{ZC}-u}(n))^*, \text{ when } N_{ZC} \text{ is } odd \text{ number.} \quad \text{[Equation 2]}$$

2. S-SS Code

The sequence used for S-SS transmits 168 cell group IDs by interleaving and combining two m-sequences with a length of 31. As sequence of S-SS, the m-sequence is robust in frequency selective environments and may reduce computation load by fast m-sequence transform using the fast Hadamard transform. Further, configuring S-SS with two short codes has been proposed to reduce the computation load of UE.

FIG. 13 shows an example in which in the logical region, two sequences are interleaved and mapped in the physical region.

Referring to FIG. 13, if two m-sequences used for generating S-SS code are S1 and S2, and S-SS of subframe 0 transmits cell group IDs with two combinations (S1, S2), then S-SS of subframe 5 swaps to (S2,S1) and transmits, thereby enabling differentiating 10 ms frame boundary. In this case, the S-SS code uses a generation polynomial of x^5+x^2+1, and a total of 31 codes may be generated through different circular shifts.

To enhance reception performance, two different, P-SS-based sequences are defined and scrambled to S-SS, with different sequences scrambled to S1 and S2. Thereafter, an S1-based scrambling code is defined and may be scrambled to S2. At this time, code of S-SS is swapped every 5 ms, but P-SS-based scrambling code is not swapped. P-SS-based scrambling code is defined with six circular shift versions according to P-SS indexes in the m-sequence generated from generation polynomial x^5+x^2+1, and S1-based scrambling code is defined with eight circular shift versions according to indexes of S1 in the m-sequence generated from polynomial x^5+x^4+x^2+x^1+1.

Reference Signal (RS)

Because data is transmitted over a wireless channel in a wireless communication system, the signal may be distorted during transmission. To accurately receive the distorted signal at the receiving end, the distortion of the received signal need be corrected using channel information. To detect the channel information, a signal transmission method known to both the transmitting side and the receiving side and a method for detecting channel information using a distortion degree when the signal is transmitted through the channel are mainly used. The above-described signal is referred to as a pilot signal or a reference signal (RS).

Most of recent mobile communication systems adopt a method for enhancing the efficiency of transmission/reception data using multiple transmission antennas and multiple reception antennas, unlike the conventional methods that use a single transmission antenna and a single reception antenna. Upon transmission/reception of data using multiple input/output antennas, the channel state between transmission antenna and reception antenna needs to be detected to precisely receive signals. Thus, each transmission antenna needs to have an individual reference signal.

In mobile communication systems, RSs are largely divided into two types depending on purposes. One is an RS for obtaining channel information, and the other for data demodulation. The former RS targets obtaining channel information on downlink and needs to be transmitted in wideband, and needs to be able to be received by a UE although the UE does not receive downlink data in a specific subframe. The former UE is also used for measurement, such as of handover. The latter RS is an RS that is sent together via the resource when the base station sends on downlink. The UE may perform channel estimation by receiving the RS and thus demodulate data. This RS needs to be transmitted in the region where data is transmitted.

Five types of downlink reference signals are defined.
Cell-specific reference signal (CRS)
Multicast-broadcast single-frequency network reference signal (MBSFN RS)
UE-specific reference signal or demodulation reference signal (DM-RS)
Positioning reference signal (PRS)
Channel state information reference signal (CSI-RS)

One reference signal is transmitted for each downlink antenna port.

The CRS is transmitted in all the downlink subframes in a cell supporting PDSCH transmission. The CRS is transmitted through one or more of antenna ports 0-3. The CRS is defined only at Δf=15 kHz.

The MBSFN RS is transmitted in the MBSFN region of the MBSFN subframe only when a physical multicast channel (PMCH) is transmitted. The MBSFN RS is transmitted through antenna port 4. The MBSFN RS is defined only in the extended CP.

The DM-RS is supported for the transmission of PDSCH, and is transmitted through antenna ports p=5, p=7, p=8 or p=7, 8, . . . , υ+6. Here, υ is the number of layers used for PDSCH transmission. The DM-RS exists and is effective for PDSCH demodulation only when PDSCH transmission is associated with the corresponding antenna port. The DM-RS is transmitted only in the resource block (RB) to which the corresponding PDSCH is mapped.

If either a physical channel or a physical signal, other than the DM-RS, is transmitted using the resource element (RE) of the same index pair (k,l) as the RE in which the DM-RS is transmitted regardless of the antenna port p, the DM-RS is not transmitted in the RE of the index pair (k,l).

The PRS is transmitted only in the resource block within the downlink subframe configured for PRS transmission.

When both the normal subframe and the MBSFN subframe are configured as positioning subframes in one cell, OFDM symbols in the MBSFN subframe configured for PRS transmission use the same CP as subframe #0. If only the MBSFN subframe is set as the positioning subframe in one cell, the OFDM symbols configured for the PRS in the MBSFN region of the subframe use the extended CP.

The start point of the OFDM symbol configured for PRS transmission in the subframe configured for PRS transmission is identical to the start point of the subframe in which all the OFDM symbols have the same CP length as the OFDM symbol configured for PRS transmission.

The PRS is transmitted through antenna port 6.

The PRS is not mapped to RE (k,l) allocated to the SSS or PSS, the physical broadcast channel (PBCH) regardless of the antenna port (p).

The PRS is defined only at Δf=15 kHz.

The CSI-RS is transmitted through 1, 2, 4, or 8 antenna ports using p=15, p=15,16, p=15, . . . , 18 and p=15, . . . , 22.

The CSI-RS is defined only at Δf=15 kHz.

The reference signal is described in more detail.

The CRS is a reference signal for obtaining information regarding the channel state shared by all the UEs in the cell and for measuring, e.g., handover. The DM-RS is used for data demodulation only for a specific UE. Information for demodulation and channel measurement may be provided using such reference signals. In other words, the DM-RS is used only for data demodulation, and the CRS is used for both purposes of channel information acquisition and data demodulation.

The receiving side (that is, the UE) measures the channel state from the CRS, and sends an indicator related to channel quality, such as a channel quality indicator (CQI), a precoding matrix index (PMI) and/or a rank indicator (RI), to the transmitting side (that is, the base station). The CRS is also referred to as a cell-specific RS. On the other hand, a reference signal related to feedback of channel state information (CSI) may be defined as a CSI-RS.

The DRS may be transmitted through resource elements when data demodulation on the PDSCH is required. The UE may receive the presence or absence of the DRS through a higher layer, and is effective only when the corresponding PDSCH is mapped. The DRS may be referred to as a UE-specific RS or a demodulation RS (DMRS).

FIG. 14 illustrates an example of a reference signal pattern mapped to a downlink resource block pair in a wireless communication system to which the disclosure may be applied.

Referring to FIG. 14, a downlink resource block pair, as a unit in which a reference signal is mapped, may be represented as one subframe in the time domain×12 subcarriers in the frequency domain. In other words, on the time axis (x axis), one resource block pair has a length of 14 OFDM symbols in the case of normal cyclic prefix (CP) (in the case of (a) of FIG. 14) and a length of 12 OFDM symbols in the case of extended CP (in the case of (b) of FIG. 14). The resource elements (REs) denoted with '0', '1', '2' and '3' in the resource block grid are the positions of CRSs of antenna port indexes '0', '1', '2' and '3', respectively, and the resource elements denoted with 'D' mean the positions of the DRSs.

The CRS is described below in more detail. The CRS is used to estimate a channel of a physical antenna and, as a reference signal that may be commonly received by all the UEs in the cell, is distributed over the entire frequency band. Further, the CRS may be used for channel quality information (CSI) and data demodulation.

The CRS is defined in various formats according to the antenna array at the transmitting side (base station). The 3GPP LTE system (e.g., Release-8) supports various antenna arrays, and the downlink signal transmission side has three types of antenna arrays, such as three single transmit antennas, two transmit antennas, and four transmit antennas. When the base station uses a single transmit antenna, reference signals for the single antenna port are arrayed. When the base station uses two transmit antennas, reference signals for the two transmit antenna ports are arrayed using a Time Division Multiplexing (TDM) and/or Frequency Division Multiplexing (FDM) scheme. In other words, the reference signals for the two antenna ports are assigned different time resources and/or different frequency resources to be distinguished from each other.

Further, when the base station uses four transmit antennas, reference signals for the four transmit antenna ports are arrayed using a TDM and/or FDM scheme. The channel information measured by the receiving side (UE) of the downlink signal may be used for demodulating the data transmitted using a transmission scheme, such as single transmit antenna transmission, transmit diversity, closed-loop spatial multiplexing, open-loop spatial multiplexing, or multi-user MIMO.

If multiple input/output antennas are supported, when a reference signal is transmitted from a specific antenna port, the reference signal is transmitted in the positions of the resource elements specified according to the pattern of the reference signal, but not in the positions of the resource elements specified for other antenna ports. In other words, reference signals between different antennas do not overlap each other.

A rule for mapping CRS to a resource block is defined as follows.

$$k = 6m + (v + v_{shift}) \mod 6 \quad \text{[Equation 3]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \mod 2) & \text{if } p = 2 \\ 3 + 3(n_s \mod 2) & \text{if } p = 3 \end{cases}$$

$$v_{shift} = N_{ID}^{cell} \mod 6$$

In Equation 3, k and l denote the subcarrier index and the symbol index, respectively, and p denotes the antenna port. $N_{symb}^{DL}$ denotes the number of OFDM symbols in one downlink slot, and $N_{RB}^{DL}$ denotes the number of radio resources allocated to the downlink. ns denotes the slot index, and $N_{ID}^{cell}$ denotes the physical cell identity. mod denotes the modulo operation. The position of the reference signal varies depending on $v_{shift}$ in the frequency domain. $v_{shift}$ is dependent on the cell ID, so that the position of the reference signal has various frequency shift values depending on cells.

More specifically, to enhance the channel estimation performance through the CRS, the position of the CRS may be shifted in the frequency domain according to the cell. For example, if reference signals are positioned every three subcarriers, the reference signals in one cell are allocated to 3kth subcarriers, and reference signals in another cell are allocated to 3k+1st subcarriers. In light of one antenna port, reference signals are arrayed every six reference elements and are separated from reference signals allocated to another antenna port, every three reference elements.

In the time domain, reference signals are arrayed at constant intervals, starting from symbol index 0 of each slot. Different time intervals are defined depending on the lengths of cyclic prefix. In the normal CP, reference signals are positioned at symbol indexes 0 and 4 of the slot and, in the extended CP, reference signals are positioned at symbol indexes 0 and 3 of the slot. The reference signal for the antenna port having the maximum value of two antenna ports is defined in one OFDM symbol. Thus, in the case of four-transmit antenna transmission, reference signals for reference signal antenna ports 0 and 1 are positioned at symbol indexes 0 and 4 (in the case of extended CP, symbol indexes 0 and 3) of the slot, and reference signals for antenna ports 2 and 3 are positioned at symbol index 1 of the slot.

The positions, in the frequency domain, of the reference signals for antenna ports 2 and 3 are interchanged in the second slot.

The DRS is described below in greater detail. The DRS is used for data demodulation. In multiple input/output antenna transmission, a precoding weight used for a specific UE is combined with a transmission channel transmitted from each transmit antenna when the UE receives the reference signal, and is used without change to estimate the corresponding channel.

The 3GPP LTE system (e.g., Release-8) supports up to four transmit antennas, and DRS for rank 1 beamforming is defined. The DRS for rank 1 beamforming also indicates a reference signal for antenna port index 5.

A rule for mapping DRS to a resource block is defined as follows. Equation 4 is one for normal CP, and Equation 5 is one for extended CP.

$$k = (k') \mod N_{sc}^{RB} + N_{sc}^{RB} \cdot n_{PRB} \quad \text{[Equation 4]}$$

$$k' = \begin{cases} 4m' + v_{shift} & \text{if } l \in \{2, 3\} \\ 4m' + (2 + v_{shift}) \mod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \mod 2 = 0 \\ 2, 3 & \text{if } n_s \mod 2 = 1 \end{cases}$$

$$m' = 0, 1, \ldots, 3N_{RB}^{PDSCH} - 1$$

$$v_{shift} = N_{ID}^{cell} \mod 3$$

$$k = (k') \mod N_{sc}^{RB} + N_{sc}^{RB} \cdot n_{PRB} \quad \text{[Equation 5]}$$

$$k' = \begin{cases} 3m' + v_{shift} & \text{if } l = 4 \\ 3m' + (2 + v_{shift}) \mod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \mod 2 = 0 \\ 1, 2 & \text{if } n_s \mod 2 = 1 \end{cases}$$

$$m' = 0, 1, \ldots, 4N_{RB}^{PDSCH} - 1$$

$$v_{shift} = N_{ID}^{cell} \mod 3$$

In Equations 3 to 5, k and p denote the subcarrier index and the antenna port, respectively. $N_{RB}^{DL}$, ns, and $N_{ID}^{cell}$ denote the number of RBs allocated to downlink, the number of slot indexes, and the physical cell identity, respectively. The position of RS varies depending on $v_{shift}$ in light of the frequency domain.

In Equations 4 and 5, k and l denote the subcarrier index and the symbol index, respectively, and p denotes the antenna port. $N_{sc}^{DL}$ denotes the resource block size in the frequency domain, and is expressed as the number of subcarriers. $n_{PRB}$ denotes the number of physical resource blocks. $N_{RB}^{PDSCH}$ denotes the frequency band of the resource block for PDSCH transmission. ns denotes the slot index, and $N_{ID}^{cell}$ denotes the physical cell identity. mod denotes the modulo operation. The position of the reference signal varies depending on $v_{shift}$ in the frequency domain. $v_{shift}$ is dependent on the cell ID, so that the position of the reference signal has various frequency shift values depending on cells.

Sounding Reference Signal (SRS)

The SRS is mainly used for channel quality measurement to perform frequency-selective scheduling of uplink, and is not related to transmission of uplink data and/or control information. However, without limitations thereto, the SRS may be used for other various purposes to enhance power control or support various start-up functions of UEs that have not been scheduled recently. Examples of start-up functions may include initial modulation and coding scheme (MCS), initial power control for data transmission, timing advance, and frequency semi-selective scheduling. In this case, the frequency semi-selective scheduling refers to scheduling in which a frequency resource is selectively allocated to the first slot of a subframe and, in the second slot, pseudo-random hopping to another frequency is performed, and a frequency resource is allocated.

Further, the SRS may be used to measure the quality of downlink channel under the assumption that the radio channel between uplink and downlink is reciprocal. This assumption is particularly effective in a time division duplex (TDD) system in which uplink and downlink share the same frequency spectrum and are separated in the time domain The subframes of SRS transmitted by a certain UE in a cell may be represented by a cell-specific broadcast signal. The 4-bit cell-specific 'srsSubframeConfiguration' parameter indicates an array of 15 possible subframes in which the SRS may be transmitted through each radio frame. These arrays provide flexibility for the adjustment of the SRS overhead according to the deployment scenario.

Among them, the 16th array completely switches off the SRS in the cell and is appropriate for serving cells that mainly serve high-rate UEs.

FIG. 15 illustrates an uplink subframe including a sounding reference signal symbol in a wireless communication system to which the disclosure may be applied.

Referring to FIG. 15, the SRS is always transmitted through the last SC-FDMA symbol in the arranged subframe. Accordingly, the SRS and the DMRS are positioned at different SC-FDMA symbols.

PUSCH data transmission is not allowed in a specific SC-FDMA symbol for SRS transmission, and as a result, when the sounding overhead is the highest, that is, even when the SRS symbol is included in all the subframes, the sounding overhead does not exceed about 7%.

Each SRS symbol is generated by a default sequence (a random sequence or a sequence set based on Zadoff-Ch (ZC)) for a given time unit and frequency band, and all the UEs in the same cell use the same default sequence. In this case, SRS transmissions from a plurality of UEs in the same cell at the same frequency band and at the same time are orthogonal to each other by different cyclic shifts of the default sequence, and are thus distinguished from each other.

SRS sequences from different cells may be distinguished from each other by allocating a different default sequence to each cell, but orthogonality between the different default sequences is not guaranteed.

Downlink Channel State Information (CSI) Feedback

In current LTE standards, there are two transmission schemes: closed-loop MIMO and open-loop MIMO operated without channel information.

In closed-loop MIMO, the transmit/receive end performs beamforming based on control information, i.e., CSI, to obtain the multiplexing gain of MIMO antenna.

To obtain CSI, the base station allocates the physical uplink control channel (PUCCH) or physical uplink shared channel (PUSCH) to the UE, enabling it to feed back downlink CSI.

CSI is largely divided into three pieces of information, such as rank indicator (RI), precoding matrix index (PMI), and channel quality indication (CQI).

First, RI denotes rank information on channel and means the number of streams that the UE receives via the same frequency time resource.

This value is dominantly determined by long term fading of channel and is thus fed back from the UE to base station typically with a longer periodicity than the PMI or CQI.

The PMI is a value reflecting the spatial properties of channel and denotes the precoding index of the base station that the UE prefers with respect to the metric, e.g., SM.

The CQI is a value indicating the strength of channel and means the reception SINR that may be obtained when the base station uses PMI.

In further advanced communication systems, such as LTE-A, obtaining additional multi-user diversity using multi-user MIMO (MU-MIMO) has been added.

To that end, higher accuracy is required in terms of channel feedback.

The reason is why, in MU-MIMO, feedback channel accuracy has a significant influence on interference with other multiplexed UEs as well as the UE having fed back due to the presence of interference between multiplexed UEs in the antenna domain.

It has been determined in LTE-A that the final PMI is designed to be divided into W1 which is the long term and/or wideband PMI and W2 which is the short term and/or sub-band PMI so as to raise feedback channel accuracy.

An example scheme of hierarchical codebook transformation that configures one final PMI from two pieces of channel information is to transform the codebook using the long-term covariance matrix of channel as follows.

[Equation 6]

$$W = \text{norm}(W1\,W2) \quad (1)$$

In Equation 6 above, W2 (=short term PMI) is the codeword of codebook created to reflect short-term channel information, W the codeword of the final codebook transformed, and norm(A) the matrix in which the norm per column in matrix A has been normalized to 1.

The specific structures of legacy W1 and W2 are as follows.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 7]}$$

$$W2(j) = \begin{bmatrix} e_M^k & e_M^l & & e_M^m \\ \alpha_j e_M^k & \beta_j e_M^l & \cdots & \gamma_j e_M^m \end{bmatrix} \text{ (if rank = r),}$$

where $1 \leq k, l, m \leq M$ and $k, l, m$ are integer.

The codeword structure has been designed to reflect the correlation characteristics of channel that occur when cross polarized antennas are used and the antennas are dense (typically when the distance between adjacent antennas is not more than a half of the signal wavelength).

The cross polarized antennas are divided into a horizontal antenna group and a vertical antenna group. Each antenna group has the characteristics of the uniform linear array (ULA) antenna, and the two antenna groups are co-located.

Thus, the inter-antenna correlation in each group has the characteristic of the same linear phase increment, and the inter-antenna group correlation has the characteristic of phase rotation.

Since the codebook is a value resulting from quantizing channel, it is needed to design the codebook by applying the characteristics of channel corresponding to the source as they are. For ease of description, from an example of a rank 1 codeword created in the above structure, it may be identified that such channel traits have been applied to the codeword meeting Equation 7.

$$W1(i) * W2(j) = \begin{bmatrix} X_i(k) \\ \alpha_j X_i(k) \end{bmatrix} \quad \text{[Equation 8]}$$

In Equation 8 above, the codeword is represented with vectors of Nt (number of Tx antennas) by 1, is structured with two vectors: higher vector $X_i(k)$ and lower vector $\alpha_j X_i(k)$, and each shows the correlation characteristics of horizontal antenna group and vertical antenna group.

$X_i(k)$ is advantageously represented as a vector with linear phase increment, with the inter-antenna correlation in each antenna group applied, and as a representative example, the DFT matrix may be used.

Further, a higher channel accuracy is needed for CoMP.

Since several base stations cooperatively transmit the same data to a specific UE in the case of CoMP JT, it may be theoretically regarded as a MIMO system in which antennas are geographically distributed.

In other words, even in the case where MU-MIMO is performed in JT, a high level of channel accuracy is required to avoid interference between the UEs co-scheduled like single cell MU-MIMO.

Further, accurate channel information is required to avoid interference of the neighbor cell with the serving cell also in the case of CoMP CB.

Restricted RLM and RRM/CSI Measurement

As a method of interference coordination, a silent subframe (almost blank subframe, also referred to as ABS) in which the aggressor cell reduces the transmission power/activity of some physical channel (including the operation of setting to zero power) may be used, and time domain inter-cell interference coordination is possible that the victim cell schedules the UE considering the same.

In this case, in the position of the victim cell UE, the interference level may significantly vary depending on subframes.

At this time, in order to measure channel state information (CSI) for performing link adaptation or radio resource management (RRM) that measures, e.g., more accurate radio link monitoring (RLM) or RSRP/RSRQ in each subframe, the monitoring/measurement needs to be limited to subframe sets with uniform interference characteristics.

In 3GPP LTE system, restricted RLM and RRM/CSI measurement has been defined as follows.

UE Operation for Reporting Channel State Information (CSI)

To report CSI constituted of CQI, PMI, and/or RI controlled by the eNB, time and frequency resources may be used by the UE.

For spatial multiplexing, the UE needs to determine the RI corresponding to the number of transmission layers.

At this time, for transmission diversity, RI is 1.

If the UE is set to transmission mode 8 or 9, PMI/RI reporting may be performed or not by the higher layer parameter pmi-RI-Report.

If the subframes are configured as $C_{CSI,0}$ and $C_{CSI,1}$ in the higher layer, the UE may be configured with resource-restricted CSI measurements.

At this time, CSI reporting may be periodic or aperiodic.

If the UE is configured with one or more serving cells, CSI may be transmitted only in the activated serving cell.

Unless the UE is configured for simultaneous transmission of PUSCH and PUCCH, the UE needs to periodically report CSI for PUCCH in subframes with no PUSCH allocated as described below.

If the UE is not configured for simultaneous transmission of PUSCH and PUCCH, the UE needs to report periodic CSI for PUSCH of serving cell with the minimum servcellindex in the PUSCH-allocated subframe.

At this time, the UE needs to start periodic CSI reporting format based on the same PUCCH for PUSCH.

Thereafter, if specified specific conditions are met, the UE is required to perform aperiodic CSI reporting via PUSCH.

Aperiodic CQI/PMI reporting and RI reporting are transmitted only when the CSI feedback type supports RI reporting.

The set of UE subbands may evaluate CQI reporting corresponding to the whole downlink system bandwidth.

Subband is a set of k PRBs, where k is the function of system bandwidth.

In the last subband in S set, the number of consecutive PRBs may be smaller than k depending on $N_{RB}^{DL}$.

The number of system bandwidths given by $N_{RB}^{DL}$ may be defined as $N = \lfloor N_{RB}^{DL}/k \rfloor$.

The subbands need to be indexed in ascending order of frequency from the minimum frequency and in an order in which size does not increase.

Table 3 shows the configuration of subband size k and system bandwidth.

TABLE 3

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

Aperiodic CSI Reporting Using PUSCH

When the UE performs decoding in subframe n in the following two cases, the UE needs to perform aperiodic CSI reporting using PUSCH in subframe n+k on the serving cell c.

Uplink DCI format or a Random Access Response Grant

In this case, the CSI reporting may be performed when each CSI request field is set for reporting and is not reserved.

When the CSI request field has a size of 1 bit, reporting on the serving cell c may be triggered if the value of the CSI request field is set to '1'.

When the CSI request field has a size of 2 bits, aperiodic CSI reporting corresponding to the values in Table 4 below may be triggered.

In this case, the UE does not expect to receive two or more aperiodic CSI reporting requests for a given subframe.

TABLE 4

| Value of CSI request field | Description |
|---|---|
| '00' | No aperiodic CSI report is triggered |
| '01' | Aperiodic CSI report is triggered for serving cell c |

TABLE 4-continued

| Value of CSI request field | Description |
| --- | --- |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

The disclosure describes a configuration method for sounding reference signal (SRS) transmission between a base station and a UE and a method for transmitting an SRS. Further, the disclosure describes a method for transmitting a physical uplink control channel (PUCCH) and/or a physical uplink shared channel (PUSCH) by the configuration method for SRS transmission between base station and UE and the SRS transmission method.

Hereinafter, SRS transmission may have the same meaning as transmitting an SRS symbol.

In the conventional LTE standard up to Rel-15, SRS may be transmitted in the last symbol of each subframe in the frequency division duplexing (FDD) system. In the time division duplexing (TDD) system, SRS may be transmitted using one or two symbols depending on a special subframe configuration using the uplink pilot time slot (UpPTS) of the special subframe in addition to the SRS transmission in the uplink (UL) normal subframe.

Further, the SRS may be transmitted using 2 or 4 symbols according to whether an additional UL-purpose SC-FDMA symbol is configured in the special subframe in addition to the existing UpPTS.

In LTE, SRS transmission schemes are differentiated depending on to trigger types. Specifically, they are divided into type 0 triggering and type 1 triggering depending on time domain characteristics. In this case, type 0 is a periodic SRS based on a higher layer configuration, and type 1 is an aperiodic SRS triggered by DCI.

Relationship between SRS and PUSCH: In LTE, the base station may configure the UE with a combination of subframe numbers assigned a cell specific SRS for a specific cell via a higher layer for the specific cell in a normal subframe.

The UE may empty the last symbol of the subframe for positioning the cell specific SRS regardless of whether an SRS for UE (UE specific SRS) has been configured when mapping PUSCH reference elements (REs) in the subframe assigned the cell specific SRS. In other words, the symbol for SRS transmission may be protected. Further, in the TDD system, if PUSCH transmission and SRS transmission collide with (overlap) each other in UpPTS of the special subframe in the time domain, the UE may refrain from transmitting SRS. Even in the case of carrier aggregation (CA), if the SRS of the first serving cell and the PUSCH of the second serving cell are positioned in the same symbol in the time domain and thus overlap each other, the UE may drop the SRS without transmitting the SRS.

Relationship between SRS and PUCCH: In LTE, SRS and PUCCH format 2 series (2/2a/2b) may collide (overlap) with each other (e.g., positioned in the same symbol) in the same subframe of the same serving cell in the time domain and, in this case, the UE behaves differently depending on the SRS triggering type.

Specifically, if the SRS has been triggered in type 0, the UE does not transmit the SRS to the base station and, if triggered in type 1, the UE does not transmit the SRS to the base station if the SRS collides with a PUCCH including an HARQ-ACK but may transmit the SRS to the base station if the SRS collides with a PUCCH including no HARQ-ACK.

Further, PUCCH format 1 series (1/1a/1b) and PUCCH formats, 3, 4, and 5 may support PUCCHs shortened in the form of not carrying data including uplink control information in the last symbol where the SRS is configurable in the subframe and, by using this, it is possible to support simultaneous transmission of SRS and PUCCH in the same subframe.

The configuration for such a shortened PUCCH may be made through a higher layer parameter ackNackSRS-SimultaneousTransmission. In other words, it is possible to set whether simultaneous transmission of PUUCH and SRS is possible using the higher layer parameter.

In a case where ackNackSRS-SimultaneousTransmission is set to 'FALSE', if the subframe/slot/subslot used for SRS transmission is identical to, and thus collides with, the subframe/slot/subslot used for PUCCH transmission including HARQ-ACK and/or positive scheduling request (SR), the UE may refrain from transmitting the SRS to the base station.

Meanwhile, although ackNackSRS-SimultaneousTransmission is set to 'TRUE', if SRS transmission collides (overlaps), in time domain (symbol level), with the PUCCH of the shortened format including an HARQ-ACK and/or positive SR, the UE may refrain from transmitting the SRS to the base station.

Meanwhile, in the case of the PUCCH format 1 series and the PUCCH format 3, the shortened PUCCH format may be used in the cell specific SRS-configured subframe regardless of whether the UE specific SRS is configured.

Further, in the case of PUCCH formats 4 and 5, in the cell specific SRS-configured subframe, regardless of whether UE specific SRS is configured, if the bandwidth used for cell specific SRS transmission and the bandwidth used for PUCCH transmission for other information than SRS overlap, the shortened PUCCH format may be used.

Hereinafter, a detailed method for additional SRS transmission in the enhanced LTE MIMO system is described. (LTE MIMO enhancement (additional SRS))

Scenarios to which such additional SRS transmission is applied may include TDD for non-CA, TDD only CA, and FDD-TDD CA.

Possible temporal positions in which a symbol for additional SRS transmission may be configured in one normal uplink subframe for a cell are as follows.

Option 1: From a cell point of view, all the symbols in one slot may be used for SRS transmission.

For example, another slot of the subframe may be used for PUSCH transmission for a short transmission time interval (sTTI) capable UE (sTTI-capable UE).

Option 2: From a cell point of view, all the symbols in one subframe may be used for SRS transmission.

Option 3: From a cell point of view, a subset of symbols in one slot may be used for SRS transmission.

For example, another slot of the subframe may be used for PUSCH transmission for an sTTI capable UE.

It is obvious that a symbol for additional SRS transmission may be configured in a position other than the above-described option.

Further, for additional SRS transmission, various configurations may be considered, e.g., performance (e.g., downlink performance enhancement, or uplink performance including legacy uplink for legacy UEs), UE specification impact, UE complexity, and radio frequency (RF) impact.

Configuring a symbol for transmitting an additional SRS and transmitting the additional SRS may lead to a downlink performance gain. For example, in a region where downlink signal-to-interference-and-noise ratio (SINR) is low, supporting symbols for transmission of additional SRS per UE in normal subframes may produce a downlink performance gain.

Further, the configuration of a symbol for transmission of additional SRS and transmission of additional SRS may be applied to both periodic SRS transmission and aperiodic SRS transmission.

Possible temporal positions in which a symbol for additional SRS transmission may be configured in one normal uplink subframe for a cell may be down-selected from the following options.

Option 1: From a cell point of view, all the symbols in one slot of one subframe may be used for SRS transmission.

Option 2: From a cell point of view, all the symbols in one subframe may be used for SRS transmission.

A resource (symbol) for SRS transmission may be configured for a specific cell (cell-specific) in slot-level granularity.

For a UE configured with symbols for additional SRS transmission in one uplink subframe, SRS transmission may be down-selected from the following options.

Option 1: Frequency hopping may be supported within one uplink subframe.

Option 2: Repeated transmission may be supported within one uplink subframe.

Option 3: Both frequency hopping and repeated transmission may be supported within one uplink subframe.

The above-described frequency hopping and/or repeated transmission within one uplink subframe may be supported for periodic/aperiodic SRS.

In symbols for additional SRS transmission, antenna switching in the subframe may be supported for periodic/aperiodic SRS transmission.

Further, antenna switching, frequency hopping, and repeated transmission in the subframe may be simultaneously configured.

A symbol for legacy SRS transmission and symbol(s) for additional SRS transmission may be configured in the same UE.

When legacy SRS transmission is aperiodic transmission, the UE transmits either or both legacy SRS or/and additional SRS to the base station using the symbol for legacy SRS transmission and/or the symbols for additional SRS transmission within the same subframe.

When legacy SRS transmission is periodic transmission, the UE may transmit legacy SRS and additional SRS to the base station on the same or different subframes using the symbol for legacy SRS transmission and the symbols for additional SRS transmission.

According to the conventional standards, up to Rel-15, in an uplink normal subframe in the LTE TDD system, an SRS for a specific cell (cell-specific SRS) and an SRS for a specific UE (UE-specific SRS) both may be configured only in one symbol in one subframe. In other words, the SRS for the specific cell and the SRS for the specific UE are configured to be transmitted using the last symbol in one subframe.

In Rel-16, LTE MIMO enhancement may support aperiodic SRS in additional SRS transmission of an uplink normal subframe. In the case of such an additional SRS, unlike the legacy SRS which may be conventionally transmitted only using the last symbol of the uplink normal subframe, it may be transmitted using one or more symbols among the other symbols than the last symbol. In other words, additional SRS may mean an SRS that is transmitted using one or more symbols among the other symbols than the last symbol of the subframe used in transmission of legacy SRS. Thus, depending on the configuration of additional SRS transmission, the SRS transmitted by the UE and the PUSCH and/or PUCCH transmitted by a UE other than the UE may collide with each other in the time domain, and may also collide with the PUSCH and/or PUCCH transmitted by the UE, which transmits the SRS, in the time domain.

To address the foregoing issues, there are described a method for configuring an aperiodic additional SRS which the base station configures in the UE, a method for triggering the additional SRS, and a method for transmitting an SRS to the base station by the UE. The UE, to which at least one method (embodiment) proposed herein is applied, may be referred to as an 'enhanced UE,' and the enhanced UE means a UE that may receive, from the base station, a configuration for the above-described additional SRS transmission, apply the same, and transmit the additional SRS to the base station.

UE-Specific Aperiodic SRS Configuration Scheme for Additional SRS

In the conventional LTE system, in the case of type 1 SRS triggering, the description of the SRS transmission related to the SRS request field of the DCI may be varied for each DCI format (0B, 3B, 4, 4A, 4B, 7-0B). Thus, the description for SRS transmission is set to differ for each codepoint indicated by the SRS request field, so that the UE may, or may not, transmit SRS depending on the description for SRS transmission indicated by each codepoint.

For example, if the codepoint indicated by the SRS request field is '00', the UE does not transmit the SRS to the base station, and if it is a code point other than '00', the UE may transmit the SRS to the base station using a parameter set according to the description for the SRS transmission indicated by each codepoint or transmission timing or a set of serving cells.

In the LTE Rel-16 standard, additional SRS (additional SRS) transmitted aperiodically may be supported, and accordingly, ambiguity may occur in relation to the aperiodic type 1 SRS triggering method transmitted by the base station and the type 1 SRS transmission method of the UE.

Thus, a type 1 SRS triggering method for additional SRS transmitted to the UE by the base station and a type 1 SRS transmission method of enhanced UE to address the above-described ambiguity are described below.

The legacy SRS and additional SRS described herein may be described or defined as type 1 SRS and type 2 SRS.

The description for legacy SRS and additional SRS transmission expressed in the disclosure may be transmitted from the base station to the UE through RRC signaling. In other words, it may be an RRC configuration configured from the base station.

(Method 1)

In the description for SRS transmission connected (mapped) with the type 1 SRS request field for each DCI format transmitted from the base station to the UE, the description of the additional SRS may be added to the description of the legacy SRS.

When the enhanced UE capable of receiving the configuration for additional SRS transmission receives an SRS transmission request through DCI (UL DCI) related to uplink control information from the base station, the UE needs to determine whether to transmit legacy SRS or additional SRS or both the legacy SRS and the additional SRS, and transmit the SRS. In other words, the base station should determine which SRS transmission (RRC) of description/configuration should be interpreted and notify the UE whether to transmit the SRS based on the description/configuration, and a specific method (operation) therefor is as follows.

In other words, if the UE receives the SRS transmission request, it needs to be clearly determined whether the description/configuration for the legacy SRS transmission or the description/configuration for the additional SRS transmission or the descriptions/configurations for both the legacy SRS transmission and the additional SRS transmission need to be interpreted, and the UE is notified of this by the following method (operation).

For example, a separate RRC parameter for selecting whether to transmit legacy SRS or additional SRS may be defined. More specifically, when the RRC parameter 'additional SRS' is set to false, the enhanced UE may transmit SRS based on the description indicated by the SRS request field for legacy SRS transmission and, if 'additionalSRS' is set to true, the enhanced UE may transmit SRS based on the description indicated by the SRS request field for additional SRS transmission.

As another method, when the enhanced UE receives an SRS transmission request through DCI (UL DCI) related to uplink control information transmitted from the base station, the UE may define and/or configure a separate RRC parameter for indicating whether to transmit only the legacy SRS to the base station or transmit both the legacy SRS and the additional SRS to the base station.

For example, when the RRC parameter 'additionalSRS' is set to false, the enhanced UE may transmit only the legacy SRS to the base station based on the description of the SRS request field related to the legacy SRS transmission and, if 'additional SRS' is set to true, the enhanced UE may interpret both the descriptions indicated by the SRS request fields related to the legacy SRS and the additional SRS and, based thereupon, transmit both the legacy SRS and the additional SRS to the base station.

In other words, in method 1, a description related to additional SRS transmission may be separately configured/defined, and the additional SRS may be transmitted using the description. It may be set/indicated through a separate RRC parameter whether to transmit the additional SRS.

Use of the above-described method 1 may reduce ambiguity for additional SRS triggering and allow for more simple and consistent processing between base station and UE.

(Method 2)

In the description for SRS transmission indicated by the type 1 SRS request field for each DCI format transmitted from the base station to the UE, the description of the additional SRS may be added to the description of the legacy SRS. In this case, each DCI format may add a one-bit field indicating whether to trigger legacy SRS transmission or additional SRS transmission. The one-bit field may play a role to switch between triggering of legacy SRS transmission and triggering of additional SRS transmission.

For example, if the one-bit field indicates '0,' the enhanced UE may regard the one-bit field of the DCI as a trigger for legacy SRS transmission and transmit the legacy SRS to the base station. If the one-bit field indicates '1,' the enhanced UE may regard it as a trigger for additional SRS transmission and transmit the additional SRS to the base station.

Although complicating the UE operation a little bit, the method may advantageously allow the base station to perform triggering while dynamically switching between legacy SRS transmission and additional SRS transmission depending on, e.g., when coverage enhancement of SRS is needed or when the UE's capacity needs to be further utilized. In other words, it is possible to flexibly configure SRS transmission by such triggering and to efficiently use resources without waste.

Further, the one-bit field, which indicates whether to trigger legacy SRS transmission or additional SRS transmission, in each DCI format described above may be used to indicate (as an indicator) whether to trigger legacy SRS transmission alone or simultaneously trigger both legacy SRS transmission and additional SRS transmission. For example, if the one-bit field is 0, it may indicate to trigger only legacy SRS transmission and, if 1, it may indicate to simultaneously trigger legacy SRS transmission and additional SRS transmission.

This method produces the effect in which when there are many users allocated to the resource region for legacy SRS transmission, the base station may selectively trigger SRS transmission, to the enhanced UE, between the resource region for legacy SRS transmission and the resource region for additional SRS transmission.

The description for SRS transmission indicated by the type 1 SRS request field for each DCI format transmitted from the base station to the UE is described in greater detail. In each N-bit codepoint indicated by the SRS request field, only the legacy SRS transmission-related description may be configured (connected, mapped), and a legacy SRS transmission-related description and an additional SRS transmission-related description both may be configured. In this case, the above-described one-bit field may be regarded as effective only when the SRS request field indicates a codepoint in which both the legacy SRS transmission-related description and the additional SRS transmission-related description are configured.

Alternatively, the above-described field may be resized from one bit to two bits, providing advantages in light of usability. In other words, it may be indicated, using the 2-bit field, whether to trigger legacy SRS transmission alone, additional SRS transmission alone, or legacy SRS transmission and additional SRS transmission both. This enables dynamic triggering configuration.

For example, if the codepoint indicated by the 2-bit field is '00,' the UE performs only legacy SRS transmission based on only the legacy SRS transmission-related description, if '01,' the UE performs only additional SRS transmission based on only additional SRS transmission-related description, if '10,' the UE transmit both the legacy SRS and the additional SRS to the base station based on both the legacy SRS transmission-related description and the additional SRS transmission-related description. In this case, the codepoint '11' may be reserved. In other words, based on the mapping between each codepoint value indicated by the field and the legacy and/or additional SRS transmission-related description, the UE may perform SRS transmission to the base station. It is obvious that the configuration (mapping) relationship between each codepoint value and the legacy SRS/additional SRS transmission-related description may be set to differ from the above-described example.

In other words, in the request field of the DCI, the legacy and/or additional SRS transmission-related description is mapped, and the UE may interpret the mapped description via a separate 1-bit or 2-bit field, other than the request field, and transmit the SRS.

Meanwhile, if enhanced PUSCH rate matching (e.g., PUSCH rate matching on the resource region for additional SRS transmission) by additional SRS transmission is supported, the 1-bit field of the DCI described above in connection with method 2 may play a role as an indicator that indicate PUSCH rate matching to the UE.

For example, if the one-bit field is set to '0,' the UE regards legacy SRS transmission as having been triggered and transmits the legacy SRS to the base station. Thus, only the legacy SRS is transmitted, and the existing configuration is maintained, and no enhanced PUSCH rate matching is needed. Accordingly, the legacy subframe-PUSCH (e.g., normal PUSCH transmitted on the remaining symbols except for the last symbol of the subframe) is transmitted using the subframe in which SRS is transmitted. In this case, last symbol PUSCH rate matching is performed according to the configuration related to legacy SRS transmission. However, if the one-bit field is set to '1,' the UE regards additional SRS transmission as having been triggered and transmits the additional SRS to the base station. In this case, the UE regards it as an indication for enhanced PUSCH rate matching for SRS transmission using a plurality of symbols and may transmit PUSCH using a reduced number of symbols like slot-PUSCH. In other words, since the additional SRS may be transmitted using a plurality of symbols, the number of symbols conventionally used for PUSCH transmission may be reduced, so that rate matching may be required.

Since additional SRS transmission may be performed using a plurality of symbols, resources for responding (e.g., channel state information reporting or ACK/NACK transmission) to uplink channel and downlink transmission may be insufficient.

Thus, to address this, additional SRS transmission may be configured to be performed only in the resource region on one slot (i.e., the first slot or the last slot) of the uplink normal subframe, and PUSCH transmission using rate matching may be performed in the remaining resource region. As such operation is configured/defined by the above-described one-bit field, a resource region where uplink transmission is performed may be secured, and processing between base station and UE may be more flexibly performed via more dynamic configuration.

(Method 3)

As the description for SRS transmission indicated by the type 1 SRS request field for each DCI format transmitted from the base station to the UE is described in greater detail, the legacy SRS transmission-related description alone or the additional SRS transmission-related description, in addition to the legacy SRS transmission-related description, may be configured/defined for each codepoint of the SRS request field. In other words, it is possible to more flexibly make a configuration related to SRS transmission from the base station to the UE.

For example, in the codepoint '01' of the SRS request field, only the legacy SRS transmission-related description may be configured/defined and, in '01,' the additional SRS transmission-related description may be configured/defined in addition to the legacy SRS transmission-related description. In this case, the enhanced UE may receive the UL DCI from the base station. If the codepoint value of the SRS request field of the UL DCI is '01,' the enhanced UE may regard only legacy SRS transmission as triggered and transmit only the legacy SRS to the base station. If the codepoint value of the SRS request field is '10,' the enhanced UE may regard both legacy SRS transmission and additional SRS transmission as triggered and transmit both the legacy SRS and the additional SRS to the base station. In this case, the codepoint may be the (bit) value of the SRS request field.

In other words, if legacy SRS/additional SRS transmission is triggered by DCI, the value indicated by the SRS request field of the DCI may be connected (mapped) with the SRS parameter set related to SRS transmission (received via RRC signaling) and, in this case, the SRS parameter set may include information for each SRS trigger. Further, legacy SRS and/or additional SRS transmission may be performed based on the SRS parameter set. In other words, the information provided from the SRS parameter set may include the above-described description.

In other words, the codepoint value indicated by the SRS request field of the DCI may be set to be associated (mapped) with both, either, or neither of the legacy SRS transmission-related description and the additional SRS transmission-related description and, based on the description, the UE may, or may not, transmit the legacy and/or additional SRS to the base station. It may be configured that two types (legacy SRS and additional SRS) of SRS transmission are performed in one cell.

In this case, it is obvious that the configuration (mapping) relationship between each codepoint value and the legacy SRS/additional SRS transmission-related description may be set to differ from the above-described example. For example, if the codepoint value is '01,' both legacy SRS transmission and additional SRS transmission may be triggered or additional SRS transmission alone may be triggered.

Method 3 may be considered as having semi-static flexibility as compared with method 2.

Further, by defining a separate RRC parameter, if the enhanced UE receives an SRS transmission request by UL DCI, it may be indicated which SRS transmission description (i.e., legacy SRS transmission-related description and/or additional SRS transmission-related description) the UE is to transmit SRS to the base station based on.

(Method 4)

Such an occasion may exist where aperiodic SRS transmission (among a plurality of CCs) is configured in a state in which component carriers (CCs) (i.e., serving cells) more than a specific number M (e.g., M=5) are configured/activated. For example, if the SRS request (field) value of the DCI meets a specific condition, such aperiodic SRS transmission may be configured. Specifically, the DCI may be in DCI format 3B and, in this case, the SRS request value is one for trigger type 1 and an SRS request value for a UE configured with five or more TDD serving cells without PUSCH/PUCCH transmission.

An additional SRS transmission-related description may be configured/defined for each codepoint indicated by the SRS request field value. Each codepoint of the SRS request field may indicate whether to configure/trigger legacy SRS transmission, configure/trigger additional SRS transmission, or configure/trigger both legacy SRS transmission and additional SRS transmission for each of the serving cells more than M. In other words, the base station may configure independent and different configurations/triggers related to SRS transmissions.

Method 4 may be applied to methods 1 to 3 described above, so that the method of triggering SRS transmission may be used even where a plurality of CCs are applied.

Conventionally, from a one-cell perspective, a parameter set (configuration) related to one SRS transmission is connected (configured) to the codepoint indicated by one DCI. For example, according to the 3GPP standards for LTE or post-LTE NR systems, upon SRS antenna switching, a parameter set related to one SRS transmission is connected to one codepoint unless some special cases apply.

In other words, if such a limitation is imposed where only one parameter set related to SRS transmission is connected to one codepoint as conventional, the number of codepoints or DCI formats to which the parameter sets aperiodically transmitted may be connected is limited, which reduce flexibility in connecting several configurations to the DCI and allowing the eNB to trigger to the UE. In other words, conventionally, the size (bit number) of the SRS request field may be incorrect, or a separate DCI format needs to be defined in connecting several configurations to the DCI and allowing the eNB to trigger to the UE.

However, use of the above-described methods described above according to the disclosure enables connection of a plurality of parameter sets related to SRS transmission (e.g., parameter sets related to legacy SRS and additional SRS transmission) in one codepoint, providing advantages in light of flexibility.

Further, when the base station transmits the codepoint to the UE, it is possible to connect only legacy SRS transmission-related parameter sets, only additional SRS transmission-related parameter sets, or both the legacy SRS transmission-relates parameter sets and additional SRS transmission-related parameter sets depending on each codepoint, and such connection may be updated on an RRC level.

If such an update is possible, a parameter set related to SRS transmission connected may be determined according to the number of legacy UEs and enhanced UEs located in a certain cell. For example, if the legacy UE is 'busy,' only additional SRS transmission-related parameters may be connected to the enhanced UE and, as such, it is possible to secure flexibility in light of multiplexing. Or, unless the legacy UE is 'busy,' an update may be performed to connect the parameter sets related to both the legacy SRS transmission and additional SRS transmission. In other words, it is possible to simultaneously obtain a downlink channel and meet uplink adaptation using parameter sets related to a plurality of SRS transmissions.

FIG. 16 is a flowchart illustrating a method of operation of a UE performing a method for transmitting a sounding reference signal (SRS) as proposed in the disclosure.

First, the UE receives configuration information related to SRS transmission from the base station (S1610).

In this case, the configuration information may include a first parameter set related to first SRS transmission and a second parameter set related to second SRS transmission.

The UE receives downlink control information (DCI) from the base station (S1620). In this case, the DCI may include at least one of first trigger information for transmission of a first SRS and second trigger information for transmission of a second SRS.

The UE transmit at least one of the first SRS and the second SRS to the base station, based on the DCI (S1630).

In this case, the first SRS and the second SRS may be transmitted using the same subframe.

The first SRS may be transmitted based on the first trigger information mapped with the first parameter set, and the second SRS may be transmitted based on the second trigger information mapped with the second parameter set.

The first SRS may be transmitted using a 14th symbol of the subframe, and the second SRS may be transmitted using one or more symbols among remaining symbols except for the symbol used for transmission of the first SRS of the subframe.

The first trigger information and the second trigger information may be included in an SRS request field of the DCI, and the first trigger information and the second trigger information may be represented as a codepoint value indicated by the SRS request field.

In this case, the first SRS and the second SRS may be aperiodic SRSs.

When the codepoint value is '01', only the first SRS may be transmitted, and when the codepoint value is '10', both the first SRS and the second SRS may be transmitted.

The DCI may further include a field indicating rate matching of a PUSCH transmitted on the subframe.

In this case, a format of the DCI may be any one of DCI formats 0B, 3B, 4, 4A, 4B and 7-0B.

Step S1630 described above may be the step of, when a plurality of serving cells are configured to the UE, independently transmitting, to the base station, at least one of the first SRS and the second SRS in each serving cell, based on the DCI A UE for transmitting a sounding reference signal (SRS) in a wireless communication system proposed in the disclosure is described with reference to FIGS. 18 to 20.

The UE may include one or more transceivers for transmitting/receiving a wireless signal, one or more processors functionally connected with the transceiver, and one or more memories storing instructions for operations executed by the one or more processors and connected with the one or more processors.

In this case, the operations executed by the one or more processors may be the same as the operations related to FIG. 16 described above.

FIG. 17 is a flowchart illustrating a method of operation of a base station receiving a sounding reference signal (SRS) in a wireless communication system as proposed in the disclosure.

First, the base station transmits configuration information related to SRS transmission to the UE (S1710).

In this case, the configuration information may include a first parameter set related to first SRS transmission and a second parameter set related to second SRS transmission;

The base station transmits downlink control information (DCI) to the UE (S1720). In this case, the DCI may include at least one of first trigger information for transmission of a first SRS and second trigger information for transmission of a second SRS.

The base station receives at least one of the first SRS and the second SRS transmitted based on the DCI, from the UE (S1730).

In this case, the first SRS and the second SRS may be transmitted using the same subframe.

The first SRS may be transmitted based on the first trigger information mapped with the first parameter set, and the second SRS may be transmitted based on the second trigger information mapped with the second parameter set.

A base station for receiving data transmitted on a shared physical channel in a wireless communication system proposed in the disclosure is described with reference to FIGS. 18 to 20.

The base station may include one or more transceivers for transmitting/receiving a wireless signal, one or more processors functionally connected with the transceiver, and one or more memories storing instructions for operations executed by the one or more processors and connected with the one or more processors.

In this case, the operations executed by the one or more processors may be the same as the operations related to FIG. 17 described above.

The UE/base station described in the disclosure may be replaced with various devices as illustrated in FIGS. 18 to 20.

For example, the operation of transmitting/receiving an SRS by the UE/base station described in FIGS. 16 and 17 may be implemented by the device of FIGS. 18 to 20 described below. For example, referring to FIG. 19, one or more processors 1912 and 1922 may control one or more memories 1914 and 1924 and/or one or more transceivers 1916 and 1926 to receive related information, and the one or more transceivers 1916 and 1926 may transmit the related information.

Operations related to the above-described methods for transmitting/receiving an SRS by the UE/base station may be implemented by a device (of, e.g., FIGS. 18 to 20) described below. For example, the operations related to the above-described SRS transmission/reception methods may be processed by one or more processors 1912 and 1922 of FIGS. 18 to 20, and the operations related to the SRS transmission/reception methods may be stored, in the form of commands/program (e.g., instructions or executable codes) for driving the at least one processor 1912 and 1922 of FIGS. 18 to 20, in the memories 1914 and 1924.

For example, in a device including one or more memories and one or more processors functionally connected with the one or more memories, the one or more processors may enable the device to receive configuration information related to SRS transmission from a base station, the configuration information including a first parameter set related to first SRS transmission and a second parameter set related to second SRS transmission, receive downlink control information (DCI) from the base station, the DCI including at least one of first trigger information for transmission of a first SRS and second trigger information for transmission of a second SRS, and transmit at least one of the first SRS and the second SRS to the base station, based on the DCI, wherein the first SRS and the second SRS are transmitted using the same subframe, and wherein the first SRS is transmitted based on the first trigger information mapped with the first parameter set, and the second SRS is transmitted based on the second trigger information mapped with the second parameter set.

As another example, in one or more non-transitory computer-readable media storing one or more instructions executable by one or more processors, the one or more instructions may instruct a user equipment to receive configuration information related to SRS transmission from a base station, the configuration information including a first parameter set related to first SRS transmission and a second parameter set related to second SRS transmission, receive downlink control information (DCI) from the base station, the DCI including at least one of first trigger information for transmission of a first SRS and second trigger information for transmission of a second SRS, and transmit at least one of the first SRS and the second SRS to the base station, based on the DCI, wherein the first SRS and the second SRS are transmitted using the same subframe, and wherein the first SRS is transmitted based on the first trigger information mapped with the first parameter set, and the second SRS is transmitted based on the second trigger information mapped with the second parameter set.

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G, LTE) between devices.

Hereinafter, a description will be given in more detail with reference to the drawings. In the following drawings/description, the same reference symbols may denote the same or corresponding hardware blocks, software blocks, or functional blocks unless described otherwise.

FIG. 18 illustrates a communication system 10000 applied to the disclosure.

Referring to FIG. 18, a communication system 10000 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 10000*a*, vehicles 10000*b*-1 and 10000*b*-2, an eXtended Reality (XR) device 10000*c*, a hand-held device 10000*d*, a home appliance 10000*e*, an Internet of Things (IoT) device 10000*f*, and an Artificial Intelligence (AI) device/server 40000. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 20000*a* may operate as a BS/network node with respect to other wireless devices.

The wireless devices 10000*a* to 10000*f* may be connected to the network 30000 via the BSs 20000. An AI technology may be applied to the wireless devices 10000*a* to 10000*f* and the wireless devices 10000*a* to 10000*f* may be connected to the AI server 40000 via the network 30000. The network 30000 may be configured using a 3G network, a 4G (e.g., LTE) network, or a 5G (e.g., NR) network. Although the wireless devices 10000*a* to 10000*f* may communicate with each other through the BSs 20000/network 30000, the wireless devices 10000*a* to 10000*f* may perform direct communication (e.g., sidelink communication) with each other without passing through the BSs/network. For example, the vehicles 10000*b*-1 and 10000*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 10000*a* to 10000*f*.

Wireless communication/connections 15000*a*, 15000*b*, or 15000*c* may be established between the wireless devices 10000*a* to 10000*f*/BS 20000, or BS 20000/BS 20000. Herein, the wireless communication/connections may be established through various RATs (e.g., 5G NR) such as uplink/downlink communication 15000*a*, sidelink communication 15000*b* (or, D2D communication), or inter BS communication(e.g. relay, Integrated Access Backhaul (IAB)). The wireless devices and the BSs/the wireless devices may transmit/receive radio signals to/from each other through the wireless communication/connections 15000*a* and 15000*b*. For example, the wireless communication/connections 15000*a* and 15000*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Wireless Devices Applicable to the Disclosure

FIG. 19 illustrates wireless devices applicable to the disclosure.

Referring to FIG. 19, a first wireless device 1910 and a second wireless device 1920 may transmit radio signals through a variety of RATs (e.g., LTE and NR). Herein, {the first wireless device 1910 and the second wireless device 1920} may correspond to {the wireless device 10000x and the BS 20000} and/or {the wireless device 10000x and the wireless device 10000x} of FIG. 18.

The first wireless device 1910 may include one or more processors 1912 and one or more memories 1914 and additionally further include one or more transceivers 1916 and/or one or more antennas 1918. The processor(s) 1912 may control the memory(s) 1914 and/or the transceiver(s) 1916 and may be configured to implement the descriptions, functions, procedures, proposals, methods, and/or operational flowcharts disclosed in this document. For example, the processor(s) 1912 may process information within the memory(s) 1914 to generate first information/signals and then transmit radio signals including the first information/signals through the transceiver(s) 1916. The processor(s) 1912 may receive radio signals including second information/signals through the transceiver 1916 and then store information obtained by processing the second information/signals in the memory(s) 1914. The memory(s) 1914 may be connected to the processor(s) 1912 and may store a variety of information related to operations of the processor(s) 1912. For example, the memory(s) 1914 may store software code including commands for performing a part or the entirety of processes controlled by the processor(s) 1912 or for performing the descriptions, functions, procedures, proposals, methods, and/or operational flowcharts disclosed in this document. Herein, the processor(s) 1912 and the memory(s) 1914 may be a part of a communication modem/circuit/chip designed to implement RAT (e.g., LTE or NR). The transceiver(s) 1916 may be connected to the processor(s) 1912 and transmit and/or receive radio signals through one or more antennas 1918. Each of the transceiver(s) 1916 may include a transmitter and/or a receiver. The transceiver(s) 1916 may be interchangeably used with Radio Frequency (RF) unit(s). In the disclosure, the wireless device may represent a communication modem/circuit/chip.

The second wireless device 1920 may include one or more processors 1922 and one or more memories 1924 and additionally further include one or more transceivers 1926 and/or one or more antennas 1928. The processor(s) 1922 may control the memory(s) 1924 and/or the transceiver(s) 1926 and may be configured to implement the descriptions, functions, procedures, proposals, methods, and/or operational flowcharts disclosed in this document. For example, the processor(s) 1922 may process information within the memory(s) 1924 to generate third information/signals and then transmit radio signals including the third information/signals through the transceiver(s) 1926. The processor(s) 1922 may receive radio signals including fourth information/signals through the transceiver(s) 1926 and then store information obtained by processing the fourth information/signals in the memory(s) 1924. The memory(s) 1924 may be connected to the processor(s) 1922 and may store a variety of information related to operations of the processor(s) 1922. For example, the memory(s) 1924 may store software code including commands for performing a part or the entirety of processes controlled by the processor(s) 1922 or for performing the descriptions, functions, procedures, proposals, methods, and/or operational flowcharts disclosed in this document. Herein, the processor(s) 1922 and the memory(s) 1924 may be a part of a communication modem/circuit/chip designed to implement RAT (e.g., LTE or NR). The transceiver(s) 1926 may be connected to the processor(s) 1922 and transmit and/or receive radio signals through one or more antennas 1928. Each of the transceiver(s) 1926 may include a transmitter and/or a receiver. The transceiver(s) 1926 may be interchangeably used with RF unit(s). In the disclosure, the wireless device may represent a communication modem/circuit/chip.

Hereinafter, hardware elements of the wireless devices 1910 and 1920 will be described more specifically. One or more protocol layers may be implemented by, without being limited to, one or more processors 1912 and 1922. For example, the one or more processors 1912 and 1922 may implement one or more layers (e.g., functional layers such as PHY, MAC, RLC, PDCP, RRC, and SDAP). The one or more processors 1912 and 1922 may generate one or more Protocol Data Units (PDUs) and/or one or more Service Data Unit (SDUs) according to the descriptions, functions, procedures, proposals, methods, and/or operational flowcharts disclosed in this document. The one or more processors 1912 and 1922 may generate messages, control information, data, or information according to the descriptions, functions, procedures, proposals, methods, and/or operational flowcharts disclosed in this document. The one or more processors 1912 and 1922 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 1916 and 1926. The one or more processors 1912 and 1922 may receive the signals (e.g., baseband signals) from the one or more transceivers 1916 and 1926 and acquire the PDUs, SDUs, messages, control information, data, or information according to the descriptions, functions, procedures, proposals, methods, and/or operational flowcharts disclosed in this document.

The one or more processors 1912 and 1922 may be referred to as controllers, microcontrollers, microprocessors, or microcomputers. The one or more processors 1912 and 1922 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 1912 and 1922. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 1912 and 1922 or stored in the one or more memories 1914 and 1924 so as to be driven by the one or more processors 1912 and 1922. The descriptions, functions, procedures, proposals, methods, and/or operational flowcharts disclosed in this document may be implemented using firmware or software in the form of code, commands, and/or a set of commands.

The one or more memories 1914 and 1924 may be connected to the one or more processors 1912 and 1922 and store various types of data, signals, messages, information, programs, code, instructions, and/or commands. The one or more memories 1914 and 1924 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 1914 and 1924 may be located at the interior and/or exterior of the one or more processors 1912 and 1922. The one or more memories 1914 and 1924 may be connected to the one or more processors 1912 and 1922 through various technologies such as wired or wireless connection.

The one or more transceivers 1916 and 1926 may transmit user data, control information, and/or radio signals/channels, mentioned in the methods and/or operational flowcharts of this document, to one or more other devices. The one or more transceivers 1916 and 1926 may receive user data, control information, and/or radio signals/channels, mentioned in the descriptions, functions, procedures, proposals, methods, and/or operational flowcharts disclosed in this document, from one or more other devices. For example, the one or more transceivers 1916 and 1926 may be connected to the one or more processors 1912 and 1922 and transmit and receive radio signals. For example, the one or more processors 1912 and 1922 may perform control so that the one or more transceivers 1916 and 1926 may transmit user data, control information, or radio signals to one or more other devices. The one or more processors 1912 and 1922 may perform control so that the one or more transceivers 1916 and 1926 may receive user data, control information, or radio signals from one or more other devices. The one or more transceivers 1916 and 1926 may be connected to the one or more antennas 1918 and 1928 and the one or more transceivers 1916 and 1926 may be configured to transmit and receive user data, control information, and/or radio signals/channels, mentioned in the descriptions, functions, procedures, proposals, methods, and/or operational flowcharts disclosed in this document, through the one or more antennas 1918 and 1928. In this document, the one or more antennas may be a plurality of physical antennas or a plurality of logical antennas (e.g., antenna ports). The one or more transceivers 1916 and 1926 may convert received radio signals/channels etc. from RF band signals into baseband signals in order to process received user data, control information, radio signals/channels, etc. using the one or more processors 1912 and 1922. The one or more transceivers 1916 and 1926 may convert the user data, control information, radio signals/channels, etc. processed using the one or more processors 1912 and 1922 from the base band signals into the RF band signals. To this end, the one or more transceivers 1916 and 1926 may include (analog) oscillators and/or filters.

Examples of Applications of Wireless Devices to which the Disclosure May be Applied FIG. 20 illustrates another example wireless device applied to the disclosure. The wireless device may be implemented in various forms according to use-examples/services.

Referring to FIG. 20, a wireless device 2100 or 2200 corresponds to the wireless devices 1910 and 1920 of FIG. 19, and includes various elements, components, units/parts, and/or modules. For example, the wireless device 1910 or 1920 may include a communication unit 2010, a control unit 2020, a memory unit 2030, and an additional component 2040. The communication unit may include a communication circuit 2012 and transceiver(s) 2014. For example, the communication circuit 2012 may include one or more processors 1912 and 1922 and/or one or more memories 1914 and 1924 of FIG. 19. For example, the transceiver(s) 2014 may include one or more transceivers 1916 and 1926 and/or one or more antennas 1918 and 1928 of FIG. 19. The control unit 2020 is electrically connected with the communication unit 2010, the memory unit 2030, and the additional component 2040, and controls the overall operation of the wireless device. For example, the control unit 2020 may control the electrical/mechanical operations of the wireless device based on programs/codes/instructions/information stored in the memory unit 2030. Further, the control unit 2020 may transmit the information stored in the memory unit 2030 to the outside (e.g., another communication device) through the communication unit 2010 and through a wireless/wired interface or may store, in the memory unit 2030, the information received through the wireless/wired interface from the outside (e.g., the other communication device) through the communication unit 2010.

Various additional components 2040 may be configured depending on the type of the wireless device. For example, the additional component 2040 may include at least one of a power unit/battery, an input/output unit (I/O unit), a driving unit, and a computing unit. The wireless device may be implemented in the form of, but not limited to, a robot (10000*a* of FIG. 18), a vehicle (10000*b*-1 or 10000*b*-2 of FIG. 18), an XR device (10000*c* of FIG. 18), a mobile device (10000*d* of FIG. 18), a home appliance (10000*e* of FIG. 18), an IoT device (10000*f* of FIG. 18), a digital broadcasting terminal, a hologram device, a public safety device, an MTC device, a medical device, a fintech device (or a financial device), a security device, a climate/environment device, an AI server/device (40000 of FIG. 18), a base station (20000 of FIG. 18), or a network node. The wireless device may be mobile or used in a fixed location depending on the use-example/service.

In FIG. 20, various elements, components, units/parts, and/or modules in the wireless device 2100 or 2200 may be all interconnected through a wired interface, or at least some thereof may be wirelessly connected through the communication unit 2010. For example, in the wireless device 2100 or 2200, the control unit 2020 and the communication unit 2010 may be wiredly connected with each other, and the control unit 2020 and a first unit (e.g., 2030 or 2040) may be wirelessly connected with each other. Further, each element, component, unit/part, and/or module in the wireless device 2100 or 2200 may further include one or more elements. For example, the control unit 2020 may be configured as one or more processor sets. For example, the control unit 2020 may be configured as a set of a communication control processor, an application processor, an electronic control unit (ECU), a graphic processing processor, and a memory control processor. As another example, the memory unit 2030 may be configured as a random access memory (RAM), a dynamic RAM (DRAM), a read only memory (ROM), a flash memory, a volatile memory, and a non-volatile memory and/or a combination thereof.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and can implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure can be implemented by various means, for example, hardware, firmware, software, or combinations thereof. When embodiments are implemented by hardware, one embodiment of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the disclosure has been shown and described in connection with examples applied to 3GPP LTE/LTE-A/NR systems, the present invention may also be applicable to other various wireless communication systems than 3GPP LTE/LTE-A/NR systems.

The invention claimed is:

1. A method for transmitting a sounding reference signal (SRS) by a user equipment (UE) in a wireless communication system, the method comprising:
receiving, from a base station, configuration information related to SRS transmission, wherein the configuration information includes i) a first parameter set related to transmission of a first SRS and ii) a second parameter set related to transmission of a second SRS;
receiving, from the base station, downlink control information (DCI), wherein the DCI includes at least one of i) first trigger information for the transmission of the first SRS and ii) second trigger information for the transmission of the second SRS; and
transmitting, to the base station, at least one of the first SRS and the second SRS, based on the DCI,
wherein the first SRS and the second SRS are transmitted in the same subframe, and
wherein the first SRS is transmitted based on the first trigger information mapped to the first parameter set, and the second SRS is transmitted based on the second trigger information mapped to the second parameter set.

2. The method of claim 1, wherein the first SRS is transmitted in a last symbol of the subframe, and the second SRS is transmitted in one or more symbols among remaining symbols except for the last symbol of the subframe.

3. The method of claim 1, wherein the first trigger information and the second trigger information are included in an SRS request field of the DCI, and wherein the first trigger information and the second trigger information are represented as a codepoint value indicated by the SRS request field.

4. The method of claim 1, wherein the first SRS and the second SRS are based on an aperiodic SRS.

5. The method of claim 3, wherein when the codepoint value is '01,' the first SRS alone is transmitted, and when the codepoint value is '10,' both the first SRS and the second SRS are transmitted.

6. The method of claim 1, wherein the DCI further includes a field indicating rate matching of a PUSCH transmitted on the subframe.

7. The method of claim 1, wherein a format of the DCI is any one of DCI formats 0B, 3B, 4, 4A, 4B and 7-0B.

8. The method of claim 1, wherein transmitting at least one of the first SRS and the second SRS to the base station based on the DCI includes, when a plurality of serving cells are configured to the UE, independently transmitting, to the base station, at least one of the first SRS and the second SRS in each serving cell, based on the DCI.

9. A user equipment (UE) transmitting a sounding reference signal (SRS) in a wireless communication system, the UE comprising:
one or more transceivers;
one or more processors; and
one or more memories storing instructions for operations executed by the one or more processors and connected with the one or more processors, wherein the operations include:
receiving, from a base station, configuration information related to SRS transmission;
wherein the configuration information includes i) a first parameter set related to transmission of a first SRS and ii) a second parameter set related to transmission of a second SRS;
receiving, from the base station, downlink control information (DCI),
wherein the DCI includes at least one of i) first trigger information for the transmission of the first SRS and ii) second trigger information for the transmission of the second SRS; and
transmitting, to the base station, at least one of the first SRS and the second SRS, based on the DCI,
wherein the first SRS and the second SRS are transmitted in the same subframe,
and wherein the first SRS is transmitted based on the first trigger information mapped to the first parameter set, and the second SRS is transmitted based on the second trigger information mapped to the second parameter set.

10. The UE of claim 9, wherein the first SRS is transmitted in a last symbol of the subframe, and the second SRS is transmitted in one or more symbols among remaining symbols except for the last symbol of the subframe.

11. The UE of claim 9, wherein the first trigger information and the second trigger information are included in an SRS request field of the DCI, and wherein the first trigger information and the second trigger information are represented as a codepoint value indicated by the SRS request field.

12. A method for receiving a sounding reference signal (SRS) by a base station (BS) in a wireless communication system, the method comprising:

transmitting, to a user equipment (UE), configuration information related to SRS transmission, the configuration information includes i) a first parameter set related to transmission of a first SRS and ii) a second parameter set related to transmission of a second SRS;

transmitting, to the UE, downlink control information (DCI), wherein the DCI includes at least one of i) first trigger information for the transmission of the first SRS and ii) second trigger information for the transmission of the second SRS; and receiving, from the UE, at least one of the first SRS and the second SRS transmitted based on the DCI, wherein the first SRS and the second SRS are transmitted in the same subframe, and wherein the first SRS is transmitted based on the first trigger information mapped to the first parameter set, and the second SRS is transmitted based on the second trigger information mapped to the second parameter set.

* * * * *